United States Patent
Subramanian et al.

(10) Patent No.: US 11,665,131 B1
(45) Date of Patent: May 30, 2023

(54) STATEFUL REDUNDANCY FOR DETERMINISTIC CARRIER-GRADE NETWORK ADDRESS TRANSLATION (NAT) SERVICES

(71) Applicant: Cisco Technology, Inc., San Jose, CA (US)

(72) Inventors: Dharmarajan Subramanian, Karnataka (IN); Prashant Anand, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/943,913

(22) Filed: Sep. 13, 2022

(51) Int. Cl.
*H04L 61/256* (2022.01)
*H04L 67/1004* (2022.01)

(52) U.S. Cl.
CPC ........ *H04L 61/256* (2013.01); *H04L 67/1004* (2013.01)

(58) Field of Classification Search
CPC .......................... H04L 61/256; H04L 67/1004
See application file for complete search history.

(56) References Cited

U.S. PATENT DOCUMENTS

| | | | |
|---|---|---|---|
| 7,814,232 B2 | 12/2010 | Satapaeti et al. | |
| 8,701,179 B1 * | 4/2014 | Penno | H04L 63/02 709/227 |
| 8,886,714 B2 | 11/2014 | Brand | |
| 8,891,540 B2 * | 11/2014 | Krishna | H04W 76/11 370/474 |
| 9,042,381 B2 | 5/2015 | Jayasenan et al. | |
| 9,258,272 B1 | 2/2016 | Durand et al. | |
| 9,331,958 B2 * | 5/2016 | Lie | H04L 49/356 |
| 9,379,978 B2 | 6/2016 | Fulli et al. | |
| 9,614,761 B1 | 4/2017 | Kamisetty et al. | |
| 9,979,602 B1 | 5/2018 | Chinnakannan et al. | |

(Continued)

OTHER PUBLICATIONS

"Understanding Multicast-Only Fast Reroute," Juniper Networks, https://juniper.net/documentation/en_US/junos/topics/concept/mcast-fast-reroute.html, Jan. 18, 2021, 10 pages.

(Continued)

*Primary Examiner* — Benjamin M Thieu
(74) *Attorney, Agent, or Firm* — Edell, Shapiro & Finnan, LLC

(57) ABSTRACT

A carrier-grade network address translation (NAT) gateway system includes a switch having a gateway function configured to receive packets that are communicated via its ingress and egress ports. The switch having the gateway function has a first link to a first NAT processing function and a second link to a second NAT processing function. The first NAT processing function has a first deterministic address/port translation function and a first mapping table for storing first binding entries. The second NAT processing function has a second deterministic address/port translation function and a second mapping table for storing second binding entries. Preferably, the first and the second deterministic address/port translation functions are the same. The switch is configured to communicate each received packet for processing at both the first and the second NAT processing functions (e.g., in either a serial manner or a parallel manner), which provides redundancy in state information.

20 Claims, 23 Drawing Sheets

(56) References Cited

U.S. PATENT DOCUMENTS

| | | |
|---|---|---|
| 10,320,658 B2 | 6/2019 | Sajassi et al. |
| 10,965,598 B1 | 3/2021 | Sharma |
| 11,128,599 B2 | 9/2021 | Babu |
| 11,210,126 B2 | 12/2021 | Dasgupta et al. |
| 2015/0295831 A1 | 10/2015 | Kumar et al. |
| 2015/0365323 A1 | 12/2015 | Duminuco et al. |
| 2016/0072766 A1 | 3/2016 | Jain et al. |
| 2016/0261998 A1 | 9/2016 | Sharma et al. |
| 2019/0089791 A1 | 3/2019 | Hammer et al. |
| 2019/0364014 A1 | 11/2019 | Endou |
| 2021/0103507 A1 | 4/2021 | Pfister et al. |
| 2022/0006747 A1 | 1/2022 | Khandelwal et al. |

OTHER PUBLICATIONS

Pulatha, "Technical Guide to Pre-Defined NAT," Cisco Community, Pre-Defined NAT White Paper, https://community.cisco.com/t5/tkb/articleprintpage/tkb-id/4441-docs-service-providers/article-id/5509. May 17, 2019, 11 pages.

"Cisco IOS XR Carrier Grade NAT Configuration Guide for the Cisco CRS Router, Release 5.3.x," Cisco, Cisco Systems, Inc., Jan. 15, 2015, 162 pages.

"CG-NAT," Vas Experts, https://vasexperts.com/products/cgnat/, retrieved from Internet Jun. 29, 2022, 5 pages.

A. Karan, et al., "Multicast-Only Fast Reroute," Internet Engineering Task Force (IETF), Request for Comments: 7431, Category: Informational, ISSN: 2070-1721, Aug. 2015, 14 pages.

S. Jiang, et al., "An Incremental Carrier-Grade NAT (CGN) for IPv6 Transition," Internet Engineering Task Force (IETF), Request for Comments: 6264, Category: Informational, ISSN: 2070-1721, Jun. 2011, 13 pages.

C. Donley, et al., "Deterministic Address Mapping to Reduce Logging in Carrier-Grade NAT Deployments," Independent Submission, Request for Comments: 7422, Category: Informational, ISSN: 2070-1721, Dec. 2014, 14 pages.

D. Wing, Ed., et al., "Port Control Protocol (PCP)," Internet Engineering Task Force (IETF), Request for Comments 6887, Category: Standards Track, ISSN: 2070-1721, Apr. 2013, 88 pages.

P. Srisuresh, et al., "Traditional IP Network Address Translator (Traditional NAT)," Network Working Group, Request for Comments: 3022, Obsoletes: 1631, Category: Informational, Jan. 2001, 16 pages.

\* cited by examiner

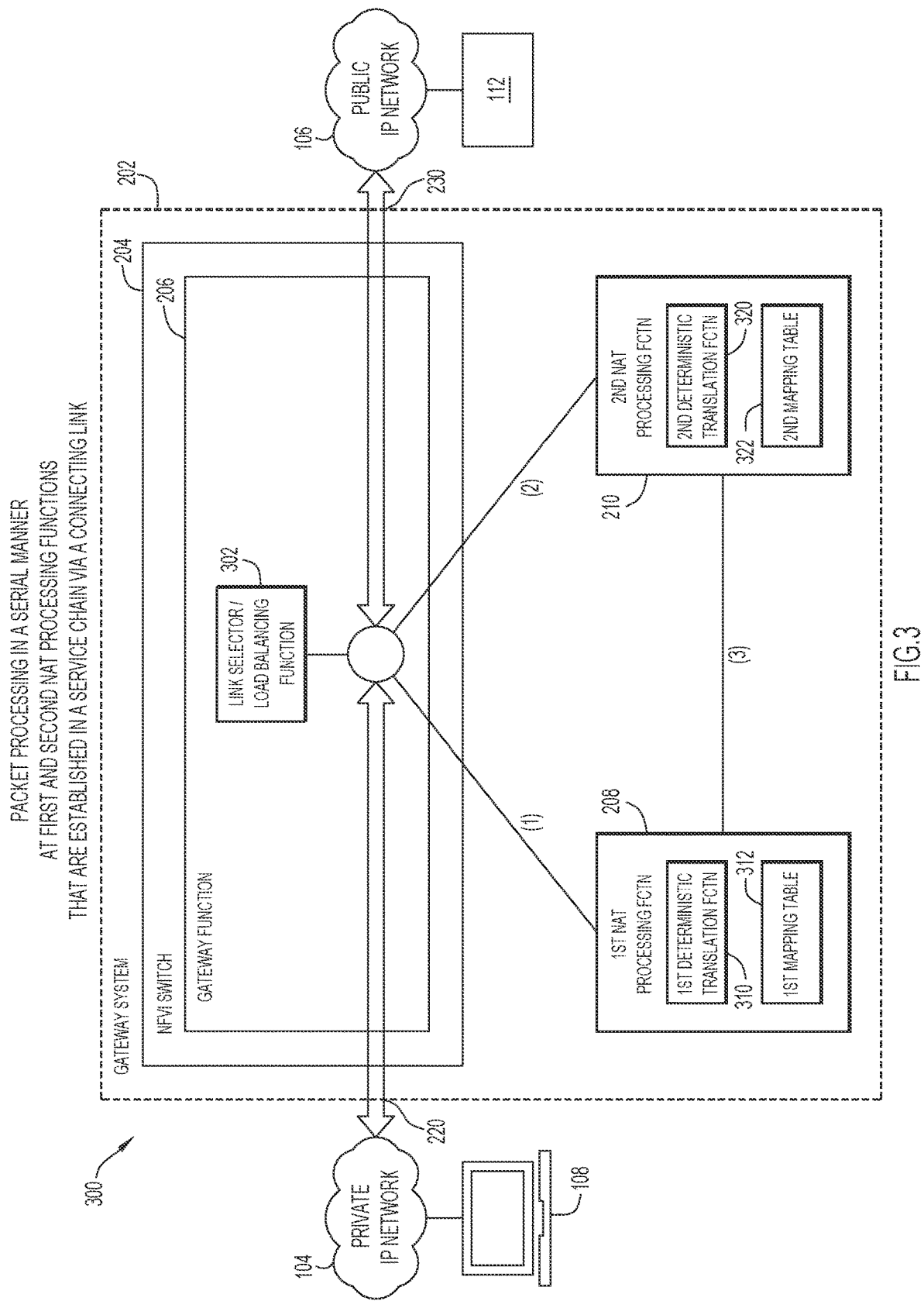

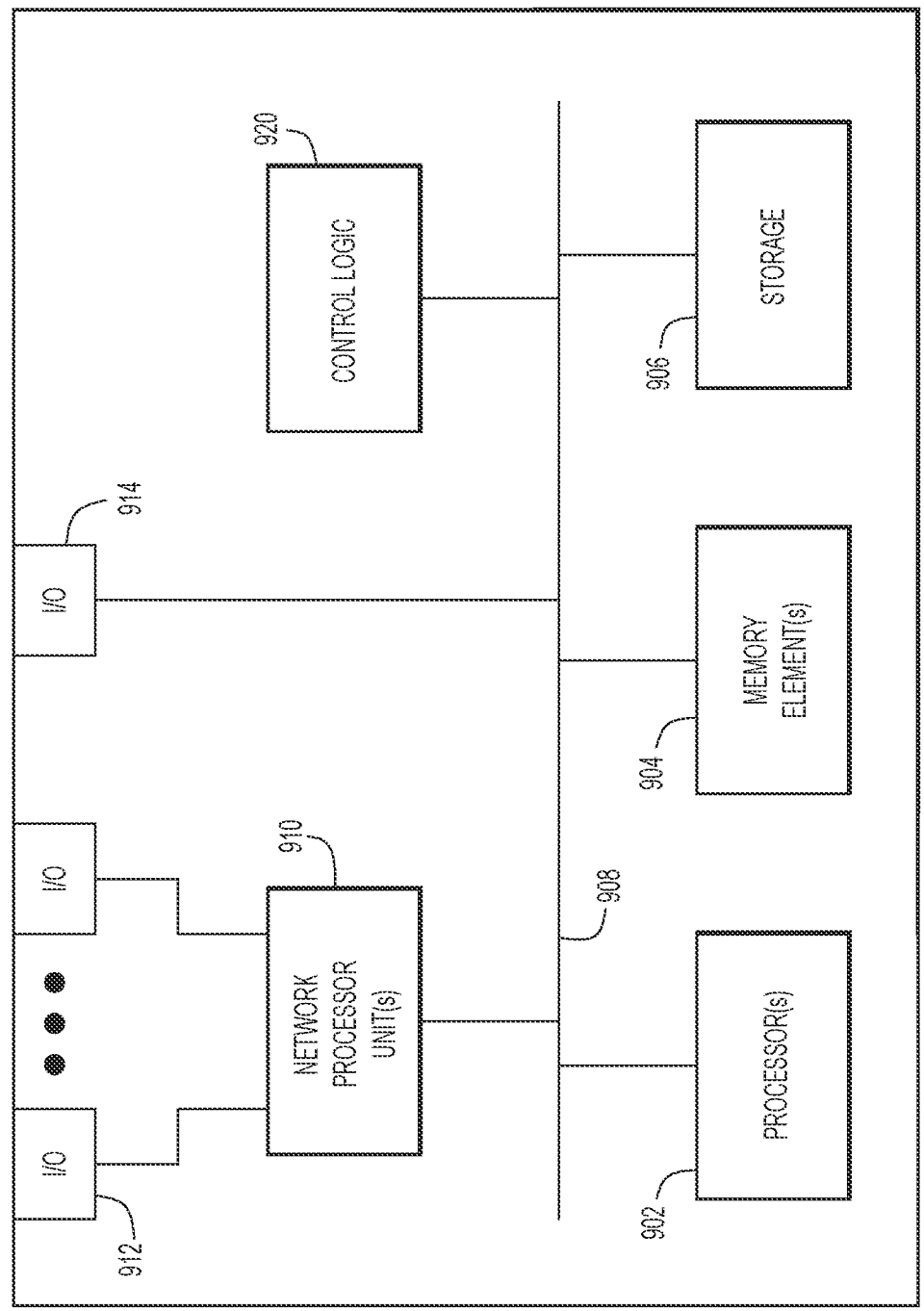

STATEFUL REDUNDANCY FOR DETERMINISTIC CARRIER-GRADE NETWORK ADDRESS TRANSLATION (NAT) SERVICES

TECHNICAL FIELD

The present disclosure relates generally to telecommunications systems, and more particularly to techniques and mechanisms for achieving stateful redundancy for deterministic carrier-grade network address translation (NAT) (CG-NAT) services.

BACKGROUND

Stateful carrier-grade network address translation (NAT) (CG-NAT) or "CGN" operations (e.g., "NAT44" operations according to Request for Comments (RFC) 3022) require per-flow states to be created and maintained over the lifetime of each flow. A flow is typically defined by information in Internet Protocol (IP) header fields of a packet, information which includes a source private address and a source layer-4 port number.

A typical CG-NAT function that provides such a service is expected to maintain, in state table, states for the flows (e.g., an allocated shared public IP address and port number for a given private source IP address/port combination). With use of a state table, a CG-NAT function is able to cater to a very large number (e.g., millions) of unique flows at any given time in a service provider (SP) network. However, the state table becomes a single point of failure if there is an event that adversely affects the CG-NAT function.

Mechanisms to synchronize these states "out-of-band" have proven to be compute-intensive and tedious to implement on most of today's network Operating Systems (OS). This can be evidenced, for example, by the fact that there is no known successful product having a CGNAT function that is implemented in-line on a network element. In order to reduce the failure footprint, many service providers have managed to work around this issue by dividing the public IP address pool and splitting the sharing domains, but this solution comes at the expense of an inefficient sharing of public IP addresses.

Some current solutions leverage a deterministic nature of NAT public IP address/port allocations for a given private IP address/port to failover traffic between active and standby NAT functions, which allows steered traffic to trigger new allocations in the standby NAT function. This solution is satisfactory as long as there is either symmetric traffic flow or at least relatively frequent packets in the inside-to-outside (I2O) direction. For asymmetric flows with a large flow of traffic in the outside-to-inside (O2I) direction, the standby NAT function will drop all traffic as there are no NAT bindings until an I2O packet creates such a binding on the standby NAT function.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is a schematic block diagram of the carrier-grade NAT gateway system of FIG. 2, which is further configured such that packet processing may be performed in a serial manner at the first and the second NAT processing functions that are established in a service chain via a connecting link (e.g., an example of a first inventive variation);

FIGS. 5A-1, 5A-2, 5A-3, and 5A-4 are schematic block diagrams which illustrate example packet processing flows at the carrier-grade NAT gateway system of FIG. 3 with use of VLAN ID tagging to implement the methods of FIGS. 4A, 4B, and 4C, for inside-to-outside (I2O) packet communication according to some implementations;

FIGS. 5B-1, 5B-2, 5B-3, and 5B-4 are schematic block diagrams which illustrate example packet processing flows at the carrier-grade NAT gateway system of FIG. 3 with use of VLAN ID tagging to implement the methods of FIGS. 4A, 4B, and 4C, for outside-to-inside (O2I) packet communication according to some implementations;

FIGS. 8A-1, 8A-2, and 8A-3 are schematic block diagrams which illustrate example packet processing flows at the carrier-grade NAT gateway system of FIG. 6 with use of VLAN ID tagging to implement the method of FIG. 7, for I2O packet communication according to some implementations;

FIGS. 8B-1, 8B-2, and 8B-3 are schematic block diagrams which illustrate example packet processing flows at the carrier-grade NAT gateway system of FIG. 6 with use of VLAN ID tagging to implement the method of FIG. 7, for O2I packet communication according to some implementations; and FIG. 9 illustrates a hardware block diagram of a computing device or a network node that may perform functions associated with operations of a carrier-grade NAT gateway system according to some implementations of the present disclosure.

DETAILED DESCRIPTION

Figure 1:
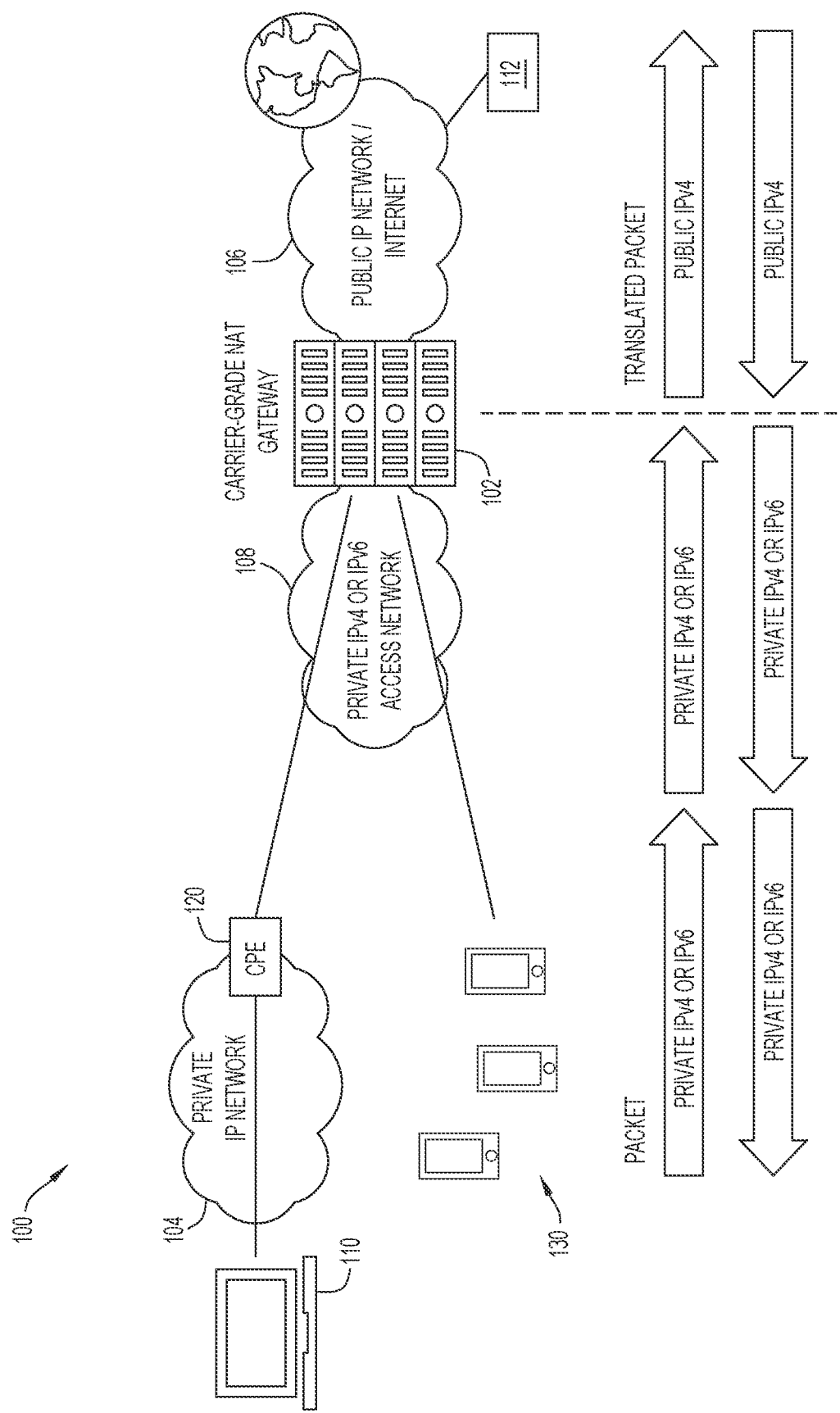
FIG. 1 is an illustrative representation of a communication system including a carrier-grade network address translation (NAT) gateway for communication between hosts in a private Internet Protocol (IP) network and a public IP network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for achieving stateful redundancy and high availability in a carrier-grade network address translation (NAT) (CG-NAT) gateway system are provided herein.

In one illustrative example, a carrier-grade NAT gateway system comprises a switch; an ingress port for connection to a private Internet Protocol (IP) network; and an egress port for connection to a public IP network. The switch has a gateway function; a first link to a first NAT processing function having a first deterministic address/port translation function and a first mapping table for storing first binding entries; and a second link to a second NAT processing function having a second deterministic address/port translation function and a second mapping table for storing second binding entries. The second deterministic address/port translation function is the same as the first deterministic address/port translation function. The switch having the gateway function is configured to receive each one of a plurality of packets that are communicated via the ingress and the egress ports, and to communicate each received packet for processing at both the first and the second NAT processing functions, which provides redundancy in state information.

Each received packet may be communicated for processing at both the first and the second NAT processing functions in a serial manner (e.g., where the first and the second NAT processing functions are established in a service chain via a connecting link), or alternatively, in a parallel manner (e.g., with use of a multicast function). Accordingly, in some implementations, the switch having the gateway function may further include a link selector function (e.g., a load balancing function) configured to select, on a flow-by-flow basis, a selected one of the first link or the second link for communicating each received packet for processing, in the serial manner, at the first and the second NAT processing functions that are established in the service chain via the connecting link. In some other implementations, the switch having the gateway function may further include a multicast function configured to communicate each received packet for processing at the first and the second NAT processing functions, by multicasting each received packet via the first and the second links for processing, in the parallel manner, at the first and the second NAT processing functions.

In some implementations, the switch comprises a network function virtualization infrastructure (NFVI) switch and the first and the second NAT processing functions comprise virtualized network functions (VNFs), such as container network functions (CNFs). In some implementations, the first and the second NAT processing functions (e.g., the VNFs or CNFs) are provided in a single distributed network element of the carrier-grade NAT gateway system. In other implementations, the first and the second NAT processing functions (e.g., the VNFs or CNFs) are provided in separate network elements of the carrier-grade NAT gateway system.

In some implementations, the first and the second deterministic address/port translation functions may be configured based on Request for Comments (RFC) 7422, and may be further configured based on static port forwarding or pre-allocation according to port control protocol (PCP) of RFC 6887.

In some implementations, when the first NAT processing function is inoperable, each subsequently received packet may be communicated via the second link for processing at the second NAT processing function. On the other hand, when the second NAT processing function is inoperable, each subsequently received packet may be communicated via the first link for processing at the first NAT processing function.

In a more generalized approach, the gateway system may be an N-way active, redundant system having multiple links to multiple NAT processing functions, where N≥2 (e.g., N=2, 3, 4, etc.).

More detailed and alternative techniques and implementations are provided herein as described below.

Example Embodiments

As described in the Background section, stateful carrier-grade network address translation (NAT) (CG-NAT) or "CGN" operations (e.g., "NAT44" operations according to Request for Comments (RFC) 3022) require per-flow states to be created and maintained over the lifetime of each flow. A flow is typically defined by information in Internet Protocol (IP) header fields of a packet, information which includes a source private address and a source layer-4 port number. A typical CG-NAT function that provides such a service is expected to maintain, in state table, states for the flows (e.g., an allocated shared public IP address and port number for a given private source IP address/port combination). With use of a state table, a CG-NAT function is able to cater to a very large number (e.g., millions) of unique flows at any given time in a service provider (SP) network. However, the state table becomes a single point of failure if there is an event that adversely affects the CG-NAT function. Conventional solutions are deficient for at least the reasons provided in the Background section.

According to some implementations of the present disclosure, redundancy and high availability (HA) in a CG-NAT gateway system may be provided with use of identical NAT functions having the same deterministic algorithm for allocating NAT bindings (e.g., as specified in RFC 7422). In some implementations, the CG-NAT gateway system may utilize an "active/active" redundancy with the deterministic NAT functions, a redundancy that does not require periodic inside-to-outside (I2O) traffic or out-of-band state synchronization to restore states on failover. In some implementations, for a given I2O address mapping, random port allocation may be handled with use of static port forwarding or pre-allocation based on a Port Control Protocol (PCP) (per RFC 6887) as a service for traffic that requires hitless redundancy.

Notably, the inventive techniques described herein include a technique for stateful switchover of traffic load across identical, deterministic NAT function instances and static port configuration using a service chaining approach for state synchronization, as well as a technique for stateful switchover of traffic load across identical, deterministic NAT function instances and static port configuration using a multicast-only fast reroute approach.

FIG. 1 is an illustrative representation of a communication system 100 including a carrier-grade NAT gateway 102 (e.g., CG-NAT gateway or CGN) of a service provider (SP) for facilitating communication between hosts (e.g., a host 110) of a private Internet Protocol (IP) network 104 and hosts (e.g., a host 112) of a public IP network 106. Private IP network 104 may be or include one or more local area networks (LANs), wireless LANs (WLANs), virtual LANs (VLANs), virtual extended LANs (VxLANs), and so on. Public IP network 106 may be or include a wide area network (WAN), such as the Internet, which may connect to one or more private networks or LANs, etc.

In example environment shown in FIG. 1, the hosts may be or include client devices/applications and server devices/applications. In some implementations, host 110 of private IP network 104 may be provided with communication access via a customer premises equipment (CPE) 120. In one example, host 110 of private IP network 104 is a computer device such as a desktop, laptop, or a tablet device which may operate as a client, and host 112 is a server that is made available on the Internet. In other implementations of FIG. 1, one or more hosts 130 (e.g., cellular phones, smart phones, Internet of Things (IoT) devices, etc.) may be provided with wireless access via a private IP access network 108, such as a WLAN or Wi-Fi network or the like.

In the example, network traffic in the communication system 100 includes IP packets that are communicated between the hosts in private IP network 104 and the hosts in public IP network 106. The IP packets may include IP packets that are addressed using private IPv4 or IPv6 addresses of private IP network 104 (or, e.g., private IP access network 108) and IP packets that are addressed using public IPv4 addresses in public IP network 106. A private IP address is typically assigned to each host in private IP network 104, and each host may be identified by its assigned private IP address. The assigned private IP address of the host is indicated, for example, in IP packets that flow to and from the host.

Carrier-grade NAT gateway 102 operates to map and translate the private IP addresses of IP packets associated with the private IP address space of private IP network 104 to the public IP addresses in IP packets associated with the public IP address space of public IP network 106. For example, carrier-grade NAT gateway 102 may operate to modify source and/or destination IP addresses/port numbers in IP packets from the hosts in private IP network 104 destined for the hosts in public IP network 106 (i.e., for I2O packet communication), and in IP packets from the hosts in public IP network 106 destined for the hosts in private IP network 104.

Figure 2:
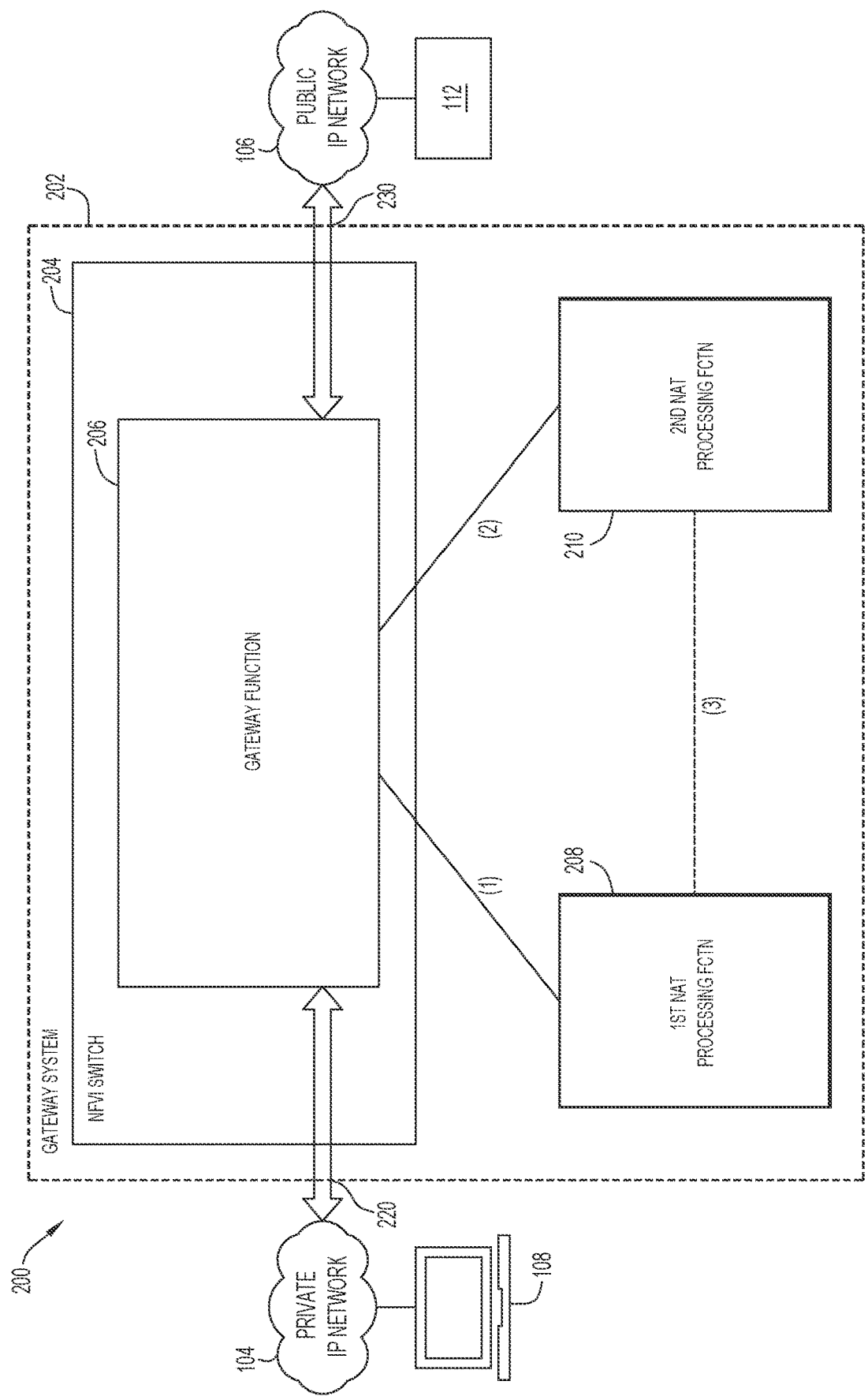
FIG. 2 is a schematic block diagram of a carrier-grade NAT gateway system according to some implementations of the present disclosure, where the carrier-grade NAT gateway system is comprised of a switch having a gateway function, a first link to a first NAT processing function, and a second link to a second NAT processing function.

FIG. 2 is a schematic block diagram 200 of a carrier-grade NAT gateway system (i.e., a gateway system 202) according to some implementations of the present disclosure. Gateway system 202 of FIG. 2 may be utilized in the communication system of FIG. 1. Gateway system 202 of FIG. 2 is comprised of a switch 204 having a gateway function 206, an ingress port 220 for connection to private IP network 104, and an egress port 230 for connection to public IP network 106. Switch 204 having gateway function 206 may be referred to as a gateway switch. Switch 204 having gateway function 206 includes at least a link (1) to a first NAT processing function 208 and a link (2) to a second NAT processing function 210.

Gateway function 206 of switch 204 is operative to receive each one of a plurality of packets that are communicated via ingress port 220 and/or egress port 230, and to communicate each received packet for processing at both first and second NAT processing functions 208 and 210 with use of the links (1) and (2). In some implementations (e.g., a first inventive variation), each received packet may be communicated for processing at both first and second NAT processing functions 208 and 210 in a serial manner, where first and second NAT processing functions 208 and 210 are established in a service chain via a connecting link (3). In some other implementations (e.g., a second inventive variation), each received packet may be communicated for processing at both first and second NAT processing functions 208 and 210 in a parallel manner with use of a multicast function (not shown in FIG. 2, but later in relation to FIG. 6 and others).

In some implementations, switch 204 is a network function virtualization infrastructure (NFVI) switch. Network Functions Virtualization (NFV) is a framework that is built upon a NFV architectural model of the European Telecommunications Standards Institute (ETSI) for virtualizing networking infrastructure and platform resources (e.g., compute, storage, and networking resources). In the NFV architecture model, the individual functions that become virtualized in software implementations (e.g., firewalls, routers, route reflectors, broadband network gateways (BNGs)) are referred to as virtual network functions (VNFs).

Accordingly, in some further implementations, first and second NAT processing functions 208 and 210 in gateway system 202 are VNFs, such as container network functions (CNFs). In some implementations, first and second NAT processing functions 208 and 210 (e.g., the VNFs or CNFs) are provided in a single distributed network element of gateway system 202. In some other implementations, first and second NAT processing functions 208 and 210 (e.g., the VNFs or CNFs) are provided in separate network elements of gateway system 202.

In some implementations, first and second NAT processing functions 208 and 210 are VNFs or CNFs that are mirror instances of the same application, having the same feature configuration and NAT address pools. In some implementations, the object is to maintain minimal states on the NFVI switch and trigger minimal programming when one of the CNF instances goes down or is otherwise inoperable. Again, the two NAT processing functions may be identical and/or use the same deterministic algorithm to allocate NAT bindings.

As described above, switch 204 having gateway function 206 is configured to communicate each received packet for processing at both first and second NAT processing functions 208 and 210, in either a serial manner or a parallel manner. In some implementations, the selection of the manner of processing (e.g., serial or parallel) may depend on one or more factors or considerations for the solution and/or the gateway switch. For example, the selection of the manner of processing may be based on one or more factors or considerations relating to latency and/or throughput. In one illustrative example, if a low latency solution is desired and the gateway switch is operable to multicast at "wire" speed, then the parallel manner (e.g., multicast) may be utilized, as the serial manner (e.g., service-chaining) would undesirably serially add to packet latency. In another illustrative example, if throughput of the gateway switch is a consideration, then the serial manner may be utilized, as the parallel manner (i.e., multicast) with its packet replication would undesirably increase the switching throughput.

Figures 1, 5A:
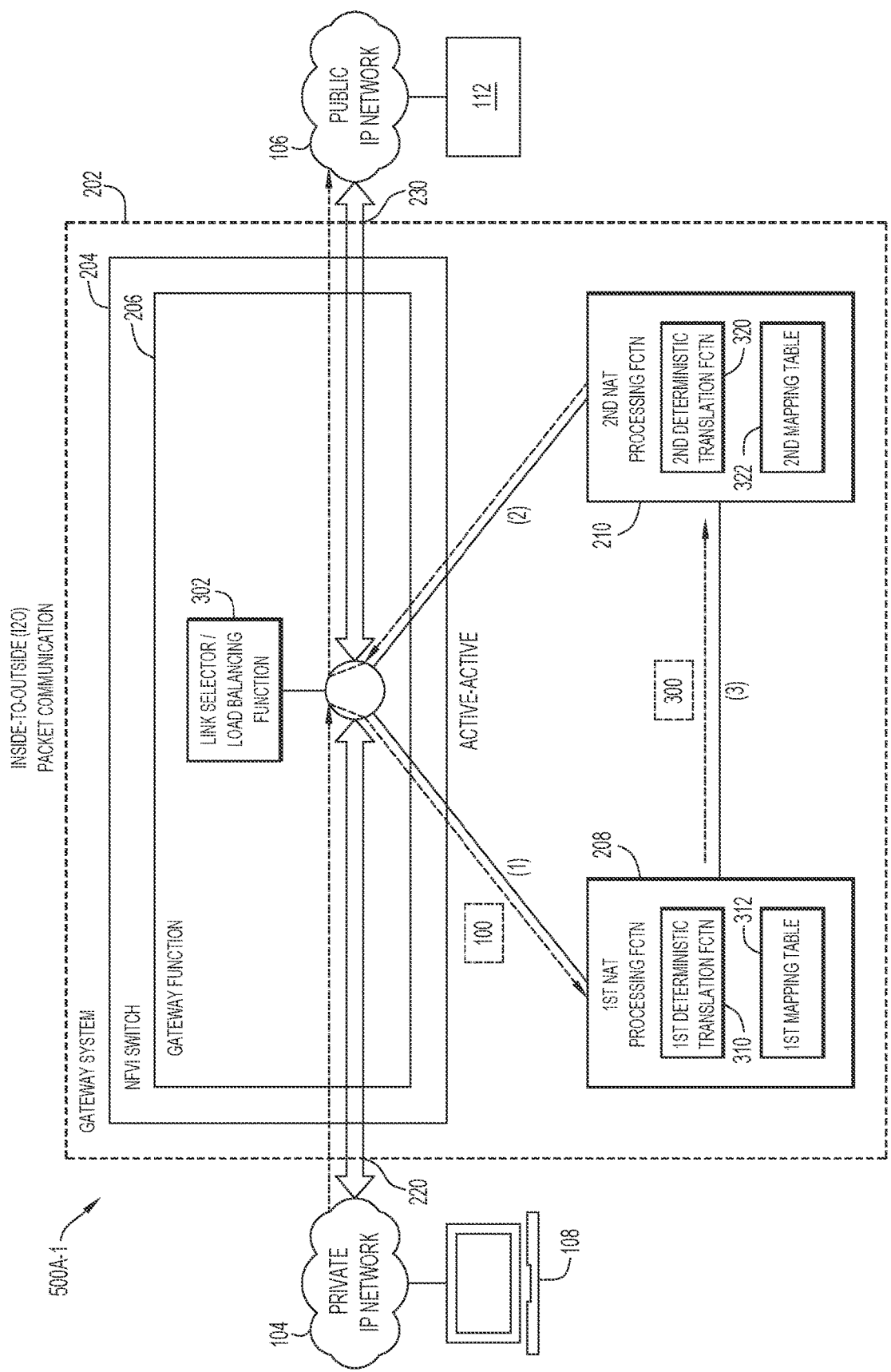
Figures 2, 5A:
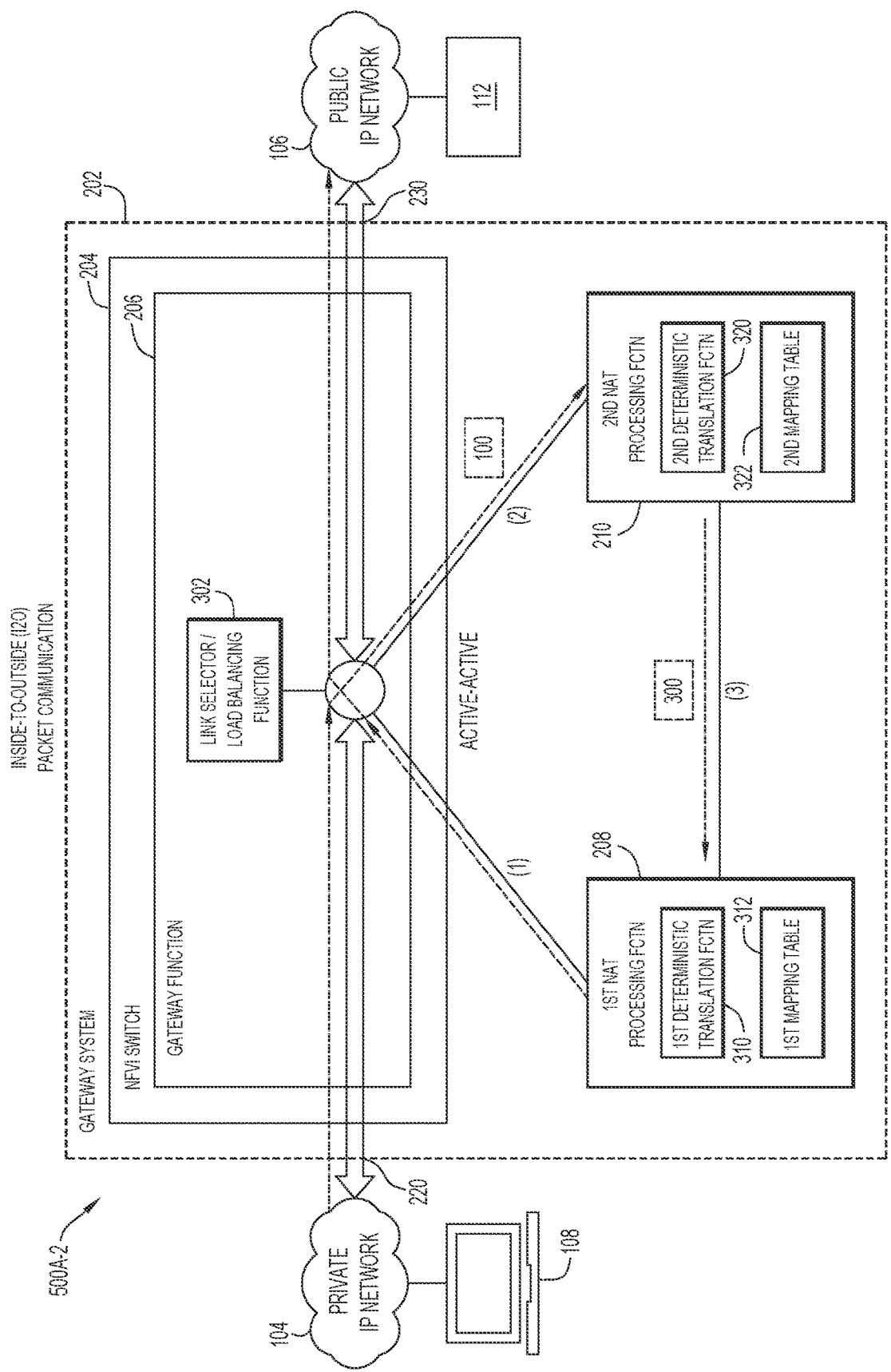
Figures 3, 5A:
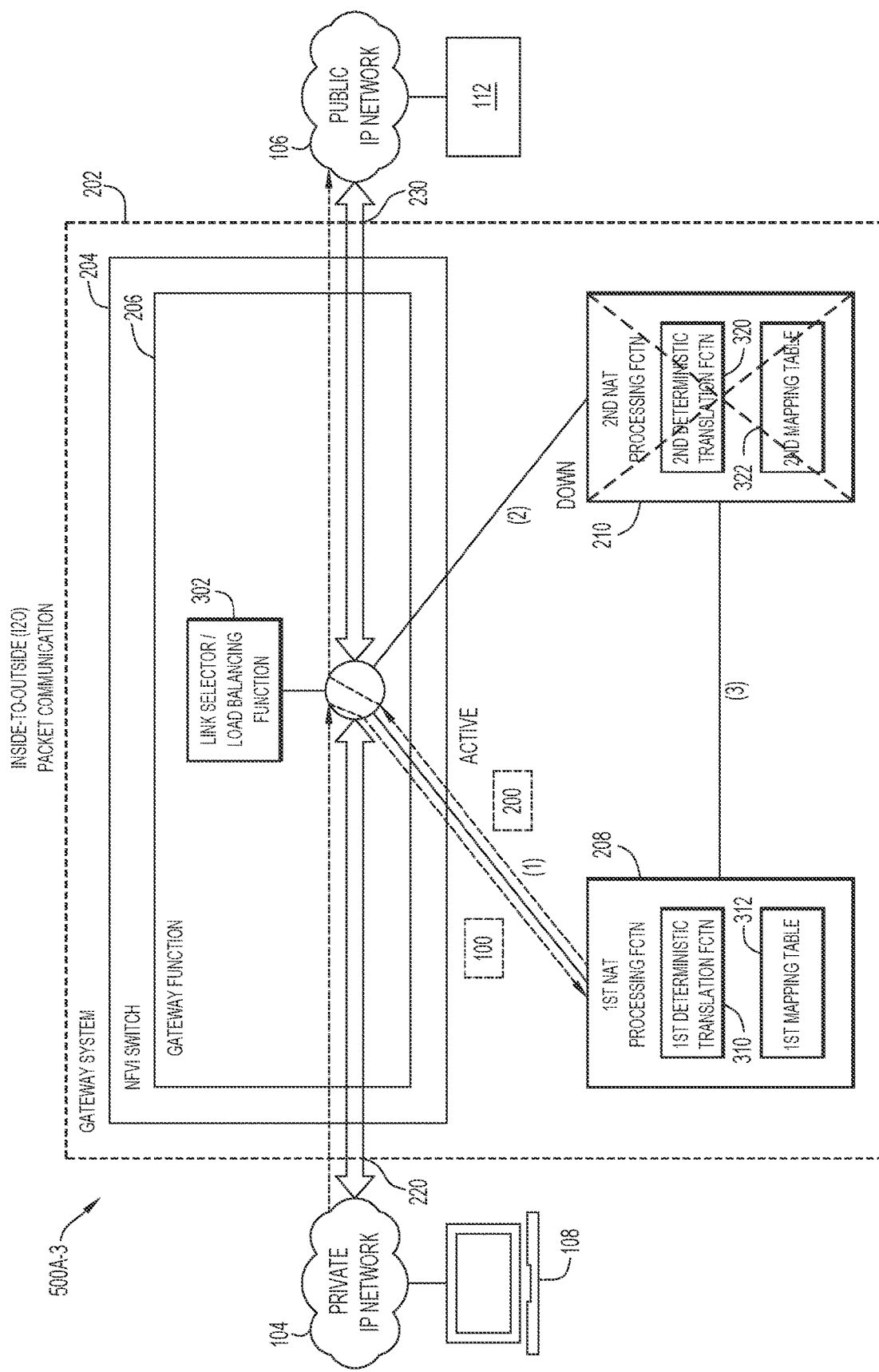

FIG. 3 is a schematic block diagram 300 of gateway system 202 of FIG. 2 according to some implementations of the present disclosure, which is one example of the first inventive variation. More particularly, gateway system 202 of FIG. 3 is configured such that packet processing is performed in a serial manner at first and second NAT processing functions 208 and 210 which are established in the service chain via connecting link (3). In FIG. 3, first NAT processing function 208 is shown to include a first deterministic address/port translation function 310 and a first mapping table 312 for storing a plurality of first binding entries. Second NAT processing function 210 is shown to include a second deterministic address/port translation function 320 and a second mapping table 322 for storing a plurality of second binding entries. In some implementations, second deterministic address/port translation function 320 of second NAT processing function 210 is the same as first deterministic address/port translation function 310 of first NAT processing function 208.

In some implementations, first and second deterministic address/port translation functions 310 and 320 are configured based on Request for Comments (RFC) 7422. See Deterministic Address Mapping to Reduce Logging in Carrier-Grade NAT Deployments, Request for Comments (RFC) 7422, Donley et al., December 2014, which is hereby incorporated by reference as though fully set forth herein. In general, RFC 7422 provides a way to manage CGN translations in order to significantly reduce the amount of logging required while providing traceability for abuse response. The RFC document proposes that CGNs could be designed and/or configured to deterministically map internal addresses to {external address+port range} in such a way as to be able to algorithmically calculate the mapping. The RFC document describes a method for such CGN address mapping, combined with block port reservations, that significantly reduces the burden on operators while offering the ability to map a subscriber's inside IP address with an outside address and external port number observed on the Internet.

In some additional implementations, first and second deterministic address/port translation functions 310 and 320 may be further configured based on static port forwarding or pre-allocation according to port control protocol (PCP) of RFC 6887. See Port Control Protocol (PCP), Request for Comments (RFC) 6887, D. Wing, Ed., et al., April 2013, which is hereby incorporated by reference as though fully set forth herein. The PCP provides a mechanism to control how incoming packets are forwarded by upstream devices (e.g., NAT64, NAT44 and firewall devices) and a mechanism to reduce application keepalive traffic. The PCP allows an application to create mappings from an external IP address, protocol, and port to an internal IP address, protocol, and port.

As is apparent, redundancy and high availability may be provided in gateway system 202 with use of identical NAT functions having the same deterministic algorithm for allocating NAT bindings according to the present disclosure. Again, in some implementations, first and second deterministic address/port translation functions 310 and 320 may be identical and/or use the same deterministic algorithm to allocate NAT bindings per RFC 7422 and/or RFC 6887. Thus, the first and the second deterministic address/port translation functions 310 and 320 may function to provide the same deterministic mapping of private addresses to public addresses extended with port ranges.

Again, gateway system 202 is configured such that packet processing is performed in a serial manner at first and second NAT processing functions 208 and 210 which are established in the service chain via connecting link (3). To facilitate such processing, switch 204 having gateway function 206 may include a link selector function 302. Link selector function 302 is configured to (e.g., dynamically) select, on a flow-by-flow basis, a selected one of the links (1) and (2) for communication of the received packet for initial processing at first NAT processing function 208 or second NAT processing function 210. Thus, in some implementations, the link may be selected based on the detected flow associated with the received packet. The definition of a flow may be configured in the load balancing function of switch 204 (e.g., where a flow is defined by information in IP header fields of a packet, information which includes a source private address and a source layer-4 port number). In some implementations, the link selector function 302 is a load balancing function for load balancing across links (1) and (2) or across first and second NAT processing functions 208 and 210.

Accordingly, switch 204 may load balance any received packet to either one of first and second NAT processing functions 208 and 210 (e.g., CNF instances) as if links (1) and (2) were part of a Link Aggregation (LAG), which is an "active/active" redundancy as seen by the switch.

When link (1) is selected for a flow, the received packet is communicated over link (1) for initial processing at first NAT processing function 208, communicated over connecting link (3) for subsequent processing at second NAT processing function 210, and then communicated over link (2) back to gateway function 206. When link (2) is selected for a flow, the received packet is communicated over link (2) for initial processing at second NAT processing function 210, communicated over connecting link (3) for subsequent processing at first NAT processing function 208, and then communicated over link (1) back to gateway function 206. In either case, if the received packet was initially received via ingress port 22 (i.e., an "inside-to-outside" (I2O) packet communication), then gateway function 206 will output the processed packet from egress port 230; otherwise (i.e., an "outside-to-inside" (O2I) packet communication), gateway function 206 will output the processed packet from ingress port 220.

Figure 4A:
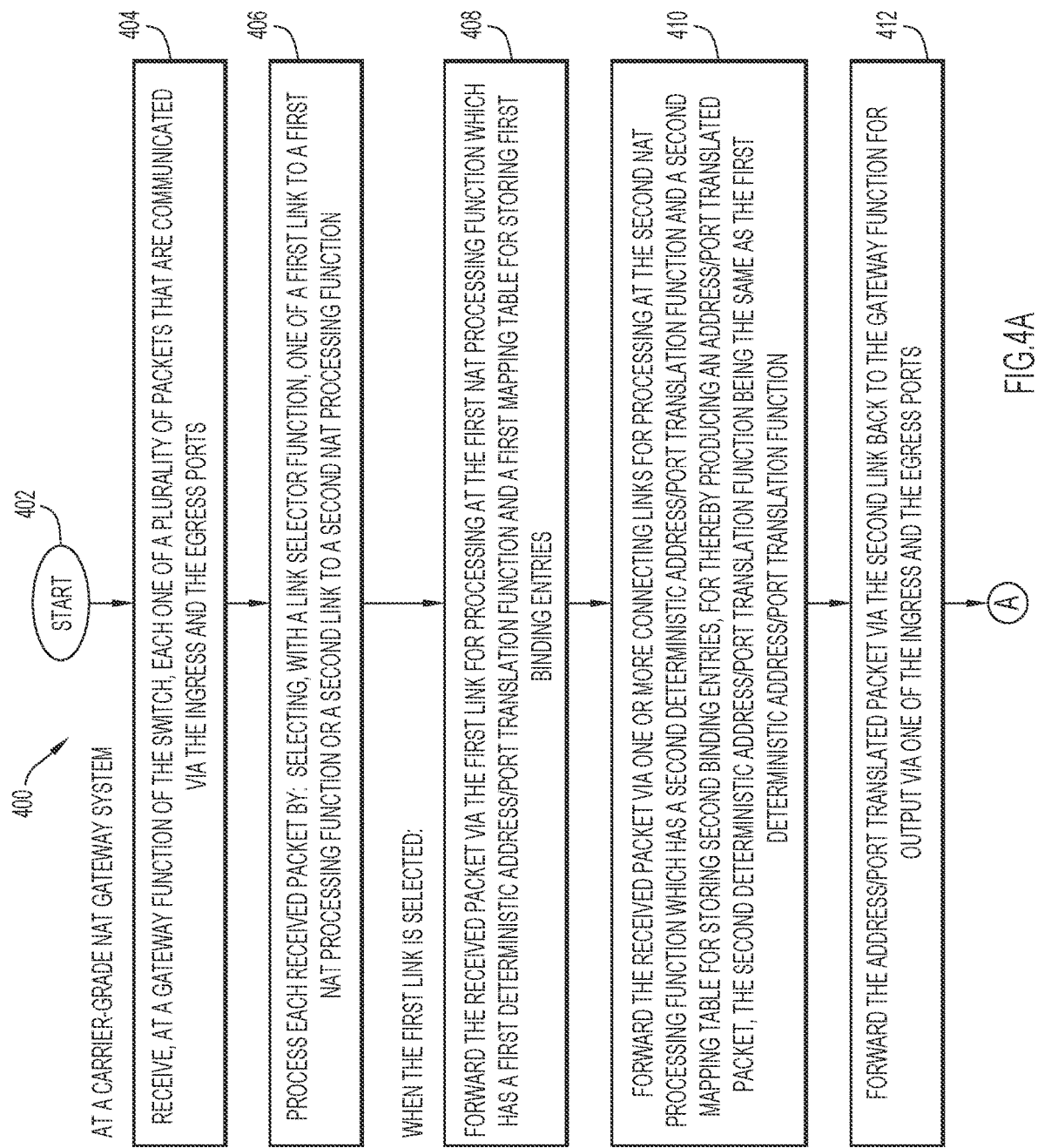
FIG. 4A is a flowchart for describing a method of processing packets at a carrier-grade NAT gateway system of FIG. 3 according to some implementations of the present disclosure (e.g., the first inventive variation)

FIG. 4A is a flowchart 400 for describing a method of processing packets at a gateway system according to some implementations of the present disclosure (e.g., the first inventive variation). In some implementations, the method of FIG. 4A may be performed by a gateway system comprised of a switch having a gateway function, an ingress port for connection to a private IP network, and an egress port for connection to a public IP network, for packet processing in a serial manner at first and second NAT processing functions (e.g., gateway system 202 of FIG. 3). The method may be embodied in a computer program product which includes a non-transitory computer readable medium and instructions stored in the non-transitory computer readable medium, where the instructions are executable by one or more processors of the gateway system. In some implementations, the method of FIG. 4A may be performed together with the method(s) described in relation to FIGS. 4B and/or 4C.

Beginning at a start block 402 of FIG. 4A, each one of a plurality of packets that are communicated via ingress and egress ports of the gateway system may be received at the gateway function (step 404 of FIG. 4A). Initially, each received packet may be processed by selecting, with a link selector function (e.g., a load balancing function), one of a first link to a first NAT processing function or a second link to a second NAT processing function (step 406 of FIG. 4A). In some implementations, the link may be selected based on the detected flow associated with the received packet. Consider the case where the first link is selected. Here, the received packet may be forwarded via the first link for processing at the first NAT processing function which has a first deterministic address/port translation function and a first mapping table for storing first binding entries (step 408 of FIG. 4A). Then, the received packet may be forwarded via a connecting link for processing at the second NAT processing function which has a second deterministic address/port translation function and a second mapping table for storing second binding entries, and thereby produce an address/port translated packet (step 410 of FIG. 4A). In some implementations, the second deterministic address/port translation function is the same as the first deterministic address/port translation function. Subsequently, the address/port translated packet may be forwarded via the second link back to the gateway function for output via one of the ingress and the egress ports (step 412 of FIG. 4A). For example, if the received packet was initially received via the ingress port (i.e., I2O packet communication), then the address/port translated packet may be output from egress port 230; otherwise (i.e., O2I packet communication), the address/port translated packet may be output from ingress port 220. Processing may continue in FIG. 4B via a connector A.

Figure 4B:
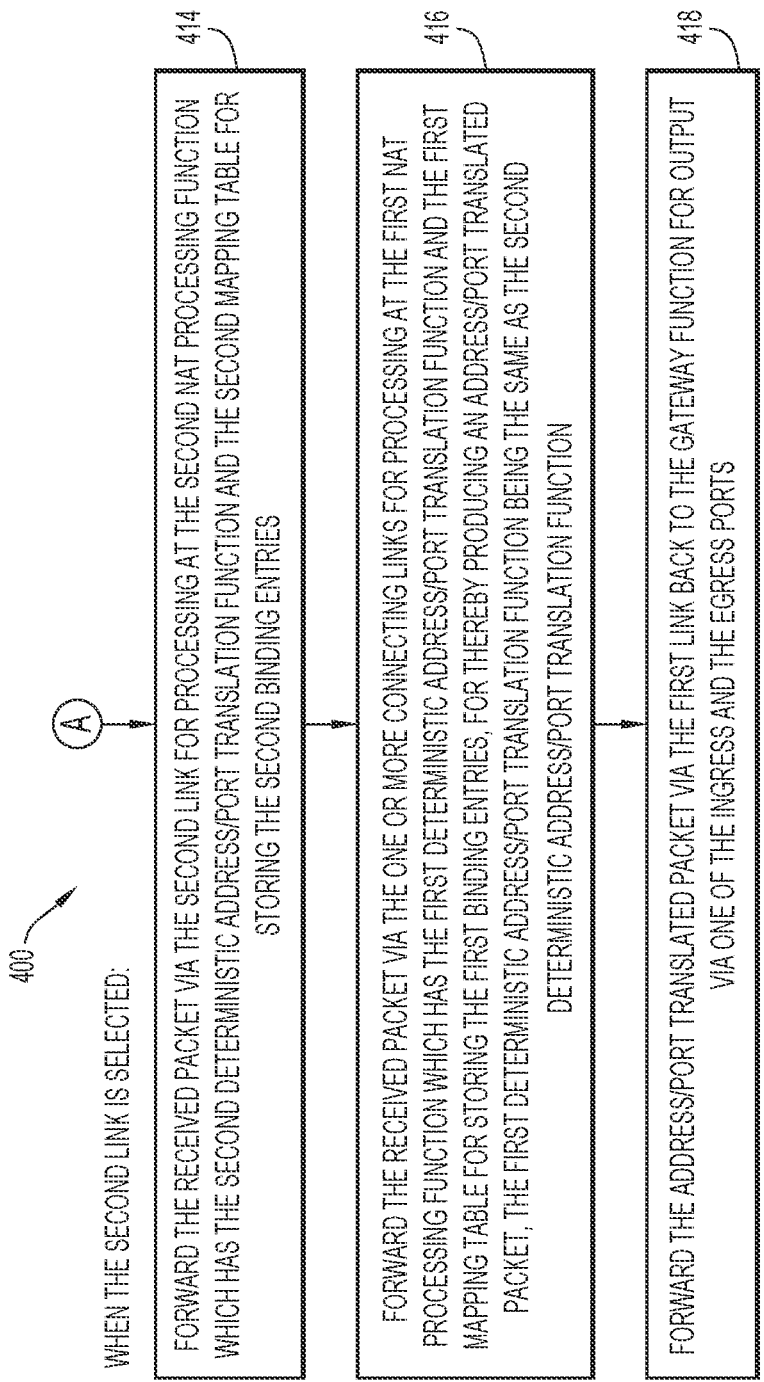
FIG. 4B is a continuation of the flowchart of FIG. 4A for further describing a method of processing packets at the carrier-grade NAT gateway system of FIG. 3 according to some implementations.

FIG. 4B is a continuation of the flowchart 400 of FIG. 4A (via connector A) for further describing the method of processing packets at the carrier-grade NAT gateway system of FIG. 3 according to some implementations (e.g., the first inventive variation). Consider the case where the second link is selected. Here, the received packet may be forwarded via the second link for processing at the second NAT processing function which has the second deterministic address/port translation function and the second mapping table for storing the second binding entries (step 414 of FIG. 4B). Then, the received packet may be forwarded via the connecting link for processing at the first NAT processing function which has the first deterministic address/port translation function and the second mapping table for storing the second binding entries, and thereby produce an address/port translated packet (step 416 of FIG. 4B). Again, in some implementations, the second deterministic address/port translation function is the same as the first deterministic address/port translation function. Subsequently, the address/port translated packet may be forwarded via the first link back to the gateway function for output via one of the ingress and the egress ports (step 418 of FIG. 4B). For example, if the received packet was received via the ingress port (i.e., I2O packet communication), then the address/port translated packet may be output from the egress port; otherwise (i.e., O2I packet communication), the address/port translated packet may be output from the ingress port.

In some implementations of FIGS. 4A and 4B, when the first NAT processing function is inoperable, each subsequently received packet may be communicated via the second link for processing at the second NAT processing function. On the other hand, when the second NAT processing function is inoperable, each subsequently received packet may be communicated via the first link for processing at the first NAT processing function. As is apparent, redundancy and high availability in a carrier-grade NAT gateway system is provided.

Figure 4C:
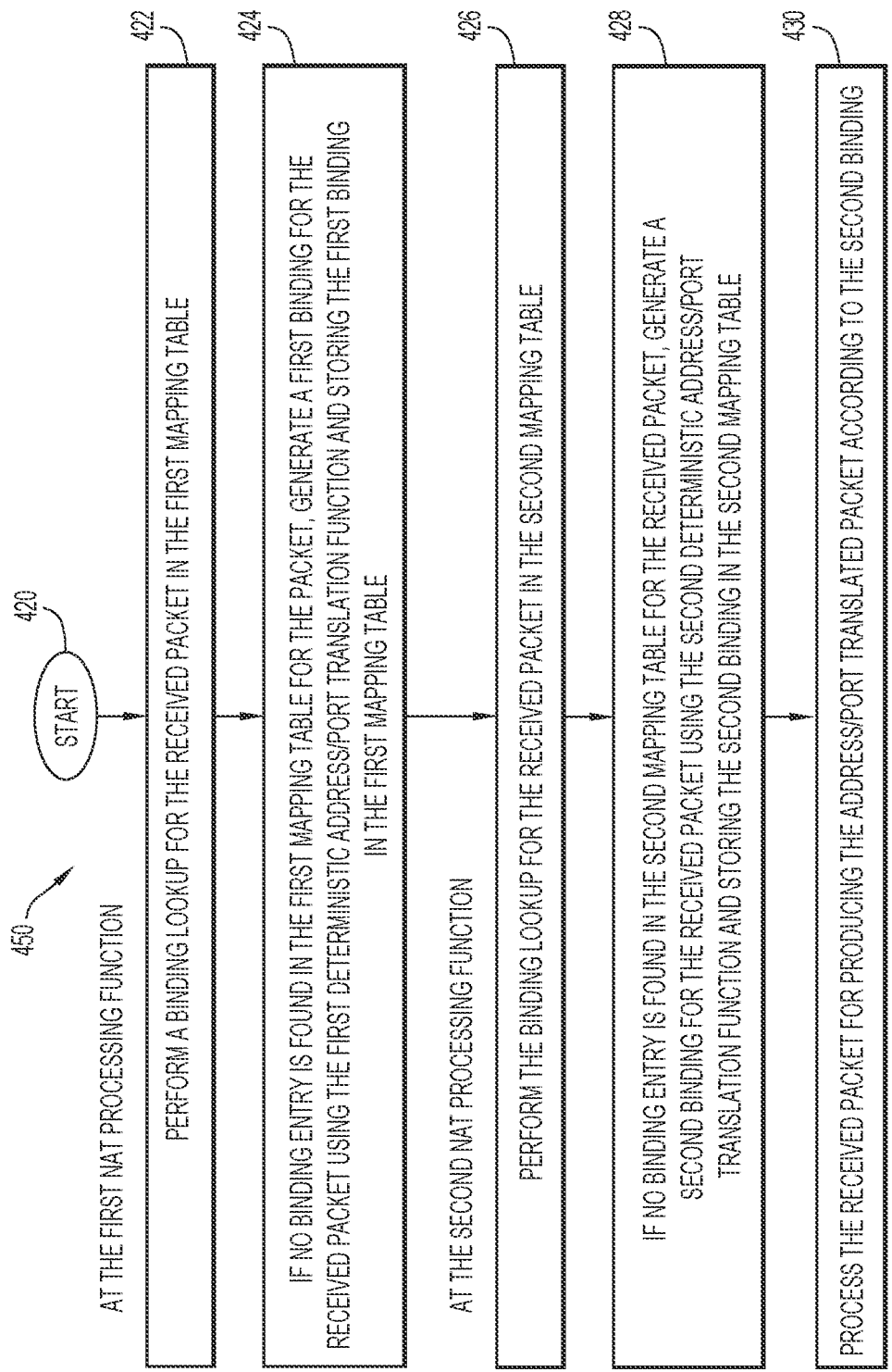
FIG. 4C is a flowchart for describing a more detailed method of processing packets at the carrier-grade NAT gateway system of FIG. 3 per the methods of FIGS. 4A and/or 4B according to some implementations.

FIG. 4C is a flowchart 450 for describing a more detailed method of processing packets at the gateway system of FIG. 3 according to some implementations (e.g., the first inventive variation). In some implementations, the method of FIG. 4C may be performed at a NAT processing function(s) of the gateway system, for example, for packet processing at the first and the second NAT processing functions in the serial manner (e.g., gateway system 202 of FIG. 3). The method may be embodied in a computer program product which includes a non-transitory computer readable medium and instructions stored in the non-transitory computer readable medium, where the instructions are executable by one or more processors of the NAT processing function(s). In some implementations, the method of FIG. 4C may illustrate the processing that may be performed by the first and the second NAT process functions in the method(s) described in relation to FIGS. 4A and/or 4B.

Beginning at a start block 420 of FIG. 4C, processing at the first NAT processing function is considered for the case where link (1) is selected. At the first NAT processing function, a binding lookup for the received packet in the first mapping table is performed (step 422 of FIG. 4C). If no binding entry is found in the first mapping table for the packet, a first binding for the received packet using the first deterministic address/port translation function is generated and the first binding is stored in the first mapping table (step 424 of FIG. 4C). Subsequent processing at the second NAT processing function is now considered. At the second NAT processing function, a binding lookup for the received packet in the second mapping table is performed (step 426 of FIG. 4C). If no binding entry is found in the second mapping table for the received translated packet, a second binding for the address/port translated packet using the second deterministic address/port translation function is generated and the second binding is stored in the second mapping table (step 428 of FIG. 4C). The received packet is processed for producing an address/port translated packet according to the second binding (step 430 of FIG. 4C).

For the case where link (2) is selected, the processing steps of the method may be similar or the same, but where the steps in FIG. 4C of the first and the second NAT processing functions may be switched or swapped. More specifically, for example, at the second NAT processing function, a binding lookup for the received packet in the second mapping table is performed. If no binding entry is found in the second mapping table for the received packet, a second binding for the received packet using the second deterministic address/port translation function is generated and the second binding is stored in the second mapping table. Subsequent processing at the first NAT processing function is now considered. At the first NAT processing function, a binding lookup for the received packet in the first mapping table is performed. If no binding entry is found in the first mapping table for the received packet, a first binding for the address/port translated packet using the first deterministic address/port translation function is generated and the first binding is stored in the first mapping table (step 430 of FIG. 4C). Next, the received packet is processed for producing an address/port translated packet according to the first binding.

As described previously, the switch of the gateway system may be a NFVI switch and the first and the second NAT processing functions may be implemented as separate NAT instances or separate CNF instances (e.g., provided in a single distributed network element or in separate network elements). In the first inventive variation, a service chaining approach between the CNF instances may be utilized. Here, the NFVI switch may load balance each received packet to either one of the CNF instances as if links (1) and (2) were part of a LAG, thereby providing an "active/active" redundancy as seen by the NFVI switch.

In a more generalized approach to what is shown and described in relation to the figures (e.g., FIGS. 2, 3, and 4A-4C), the gateway system may be an N-way active, redundant system having multiple links to multiple NAT processing functions, where $N \geq 2$ (e.g., N=2, 3, 4, etc.). In the serial or service chain implementation, for example, all of the NAT processing functions will create bindings, if and as necessary, but only the last NAT processing function will edit the packet (i.e., translate the packet into the address/port translated packet). Here, all of the NAT processing functions may be connected in series via a plurality of connecting links, or at least connected via one or more connecting links (as N may be 2).

In some preferred implementations, packet processing at the different CNF instances may be better facilitated with use of Virtual Local Area Network (VLAN) ID tagging, where VLAN IDs are "pushed" (added) onto and "popped" (removed) from each packet communication. The VLAN ID tagging (or more generally, packet tagging) may be used to properly route/track incoming packets through the CNF instances and the ingress and the egress ports.

To better explain, an illustrative example associated with the first inventive variation is now described, where the gateway system utilizes first and second (identical) CNF instances. From the NFVI switch, link (1) to the first CNF instance is provided, link (2) is to the second CNF instance is provided, and connecting link (3) between the first and the second CNF instances is also provided. Consider one of the CNF instances, where the NFVI switch "pushes" all I2O flows with VLAN ID "100" and "pushes" all O2I flows with VLAN ID "200." Each CNF instance is configured to allocate NAT bindings independently for I2O flows coming with VLAN ID "100" and "300." Here, the allocations are automatically in sync because the bindings are deterministic and the allocation algorithm is same on both first and second CNF instances.

With respect to the first CNF instance, incoming VLAN "100" and "200" may be mapped to VRF RED and incoming VLAN "300" and "400" may be mapped to VRF BLUE. VRF RED has two (2) static default routes with different administrative distances/metrics for high availability (HA): 0.0.0.0/0<next hop>(3) metric 1; and 0.0.0.0/0<next hop> (1) metric 2. This routing scheme allows the packet to be forwarded over link (2) when the second CNF instance is present or sent back over link (1) if the second CNF instance is down. VRF BLUE has a single default route for 0.0.0.0/0<next hop>(1).

For all incoming packets with VLAN ID of "100" over link (1), a NAT lookup is performed. If a binding entry is found, then NAT processing continues. Otherwise, new bindings are created, and NAT processing occurs. The adjacency attached to the next hop over connecting link (3) uses a VLAN ID of "300" in addition to conventional Ethernet encapsulation. The adjacency attached to the next hop over link (1) uses a VLAN ID of "200" in addition to the Ethernet encapsulation.

For all incoming packets with VLAN ID of "200" over link (1), a NAT lookup is performed. If a binding entry is found, then NAT processing continues. Otherwise, the packet is dropped. The adjacency attached to the next hop over connecting link (3) uses a VLAN ID of "400" in addition to the Ethernet encapsulation. Adjacency attached to the next hop over (1) uses a VLAN ID of "100" in addition to the Ethernet encapsulation.

For all incoming packets with VLAN ID of "300" over connecting link (3), a NAT lookup is performed. If a binding entry is found, then NAT processing is skipped, and the packet is forwarded. Otherwise, NAT processing is still skipped but a new binding is created. Since the mapping algorithm is deterministic and identical between the first and the second CNF instances, the binding will also be same as the one on the other CNF instance. The adjacency attached to the next hop over link (1) uses a VLAN ID of "100" in addition to the Ethernet encapsulation.

For all incoming packets with VLAN ID of "400" over connecting link (3), a NAT lookup is performed. If a binding entry is found, then NAT processing is skipped, and the packet is forwarded. Otherwise, the packet is dropped. The adjacency attached to the next hop over link (1) uses a VLAN ID of "200" in addition to the Ethernet encapsulation.

With respect to the second CNF instance, the second CNF instance has symmetric routes, VLAN, and processing as described above in relation to the first CNF instance, except that link (2) replaces link (1).

To further illustrate by example, FIGS. 5A-1, 5A-2, 5A-3, and 5A-4 are schematic block diagrams 500A-1, 500A-2, 500A-3, and 500A-4 which illustrate example packet processing at gateway system 202 of FIG. 3 with use of VLAN ID tagging to implement the methods of FIGS. 4A, 4B, and 4C, for I2O packet communication according to some implementations.

With reference to schematic block diagram 500A-1 of FIG. 5A-1, a packet is received at the gateway function 206 via ingress port 220 of switch 204 (i.e., an I2O packet communication), where link selector function 302 selects link (1) for packet forwarding. The received packet is tagged with a VLAN ID of "100" and forwarded to first NAT processing function 208 via link (1). The received packet having the VLAN ID of "100" is processed at first NAT processing function 208. The received packet is then retagged with a VLAN ID of "300" and forwarded to second NAT processing function 210 via connecting link (3). The received packet having the VLAN ID of "300" is processed at second NAT processing function 210, which thereby produces an address/port translated packet. The address/port translated packet having the VLAN ID of "300" is then forwarded back to the gateway function 206 via link (2), for output via egress port 230.

With reference to schematic block diagram 500A-2 of FIG. 5A-2, a packet is received at the gateway function 206 via ingress port 220 of switch 204 (i.e., an I2O packet communication), where link selector function 302 selects link (2) for packet forwarding. The received packet is tagged with a VLAN ID of "100" and forwarded to second NAT processing function 210 via link (2). The received packet having the VLAN ID of "100" is processed at second NAT processing function 210. The received packet is then retagged with a VLAN ID of "300" and forwarded to first NAT processing function 208 via connecting link (3). The received packet having the VLAN ID of "300" is processed at first NAT processing function 208, which thereby produces an address/port translated packet. The address/port translated packet having the VLAN ID of "300" is then forwarded back to the gateway function 206 via link (1), for output via egress port 230.

With reference to schematic block diagram 500A-3 of FIG. 5A-3, a packet is received at the gateway function 206 via ingress port 220 of switch 204 (i.e., an I2O packet communication), for the case where second NAT processing function 210 is down, taken off-line, or otherwise inoperable. Thus, link selector function 302 selects link (1) for packet forwarding. The received packet is tagged with a VLAN ID of "100" and forwarded to first NAT processing function 208 via link (1). The received packet having the VLAN ID of "100" is processed at first NAT processing function 208. The address/port translated packet is retagged with a VLAN ID of "200" and forwarded back to the gateway function 206 via link (1), for output via egress port 230.

Figures 4, 5A:
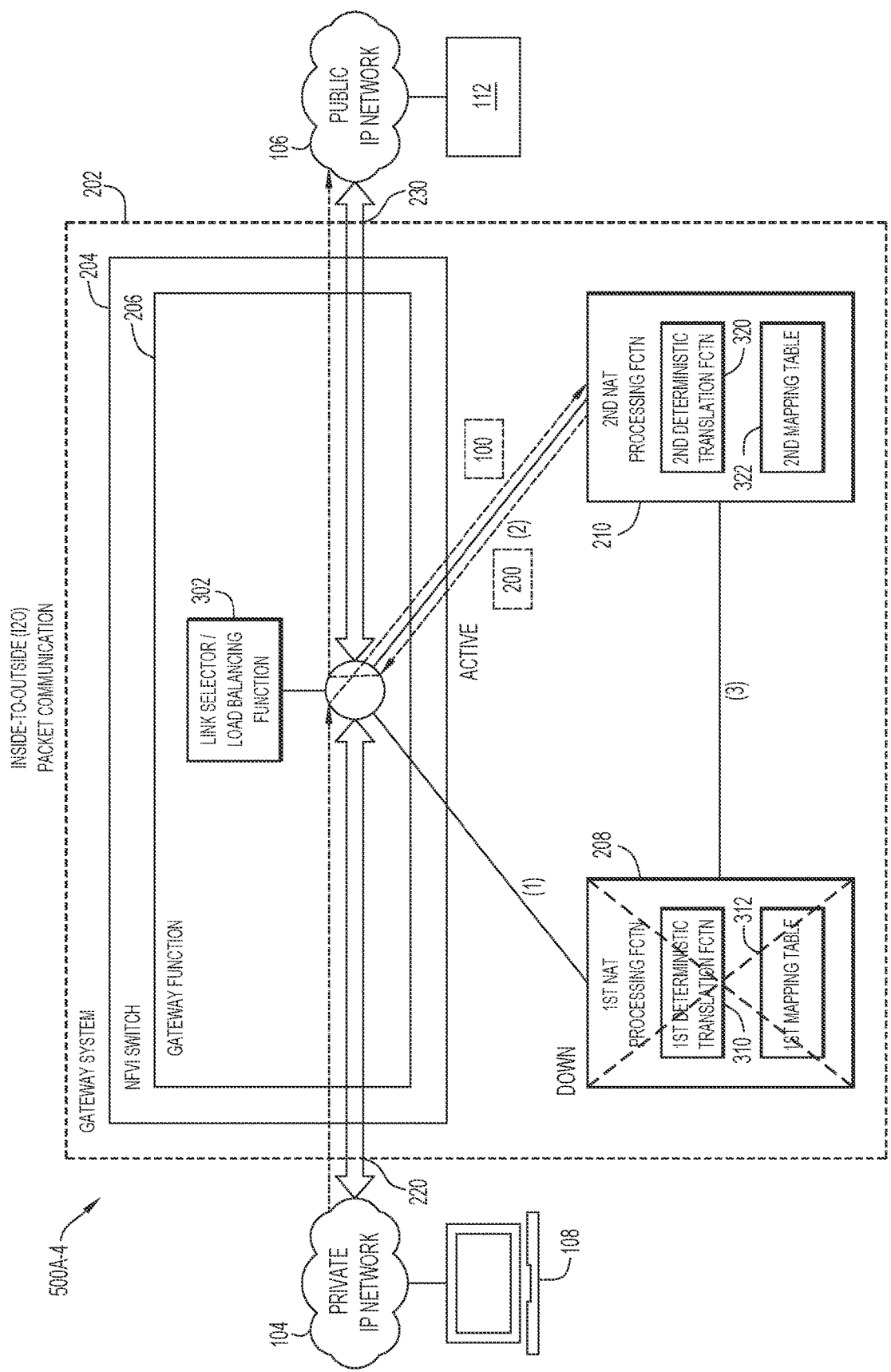

With reference to schematic block diagram 500A-4 of FIG. 5A-4, a packet is received at the gateway function 206 via ingress port 220 of switch 204 (i.e., an I2O packet communication), for the case where first NAT processing function 208 is down, taken off-line, or otherwise inoperable. Thus, link selector function 302 selects link (2) for packet forwarding. The received packet is tagged with a VLAN ID of "100" and forwarded to second NAT processing function 210 via link (2). The received packet having the VLAN ID of "100" is processed at second NAT processing function 210. The address/port translated packet is retagged with a VLAN ID of "200" and forwarded back to the gateway function 206 via link (2), for output via egress port 230.

FIGS. 5B-1, 5B-2, 5B-3, and 5B-4 are schematic block diagrams 500B-1, 500B-2, 500B-3, and 500B-4 which illustrate example packet processing at gateway system 202 of FIG. 3 with use of VLAN ID tagging to implement the methods of FIGS. 4A, 4B, and 4C, for O2I packet communication according to some implementations. The packet processing described in relation to FIGS. 5B-1, 5B-2, 5B-3, and 5B-4 are substantially the same or similar to the packet processing described in relation to previous FIGS. 5A-1, 5A-2, 5A-3, and 5A-4, and provided for better clarity and completeness.

Figures 1, 5B:
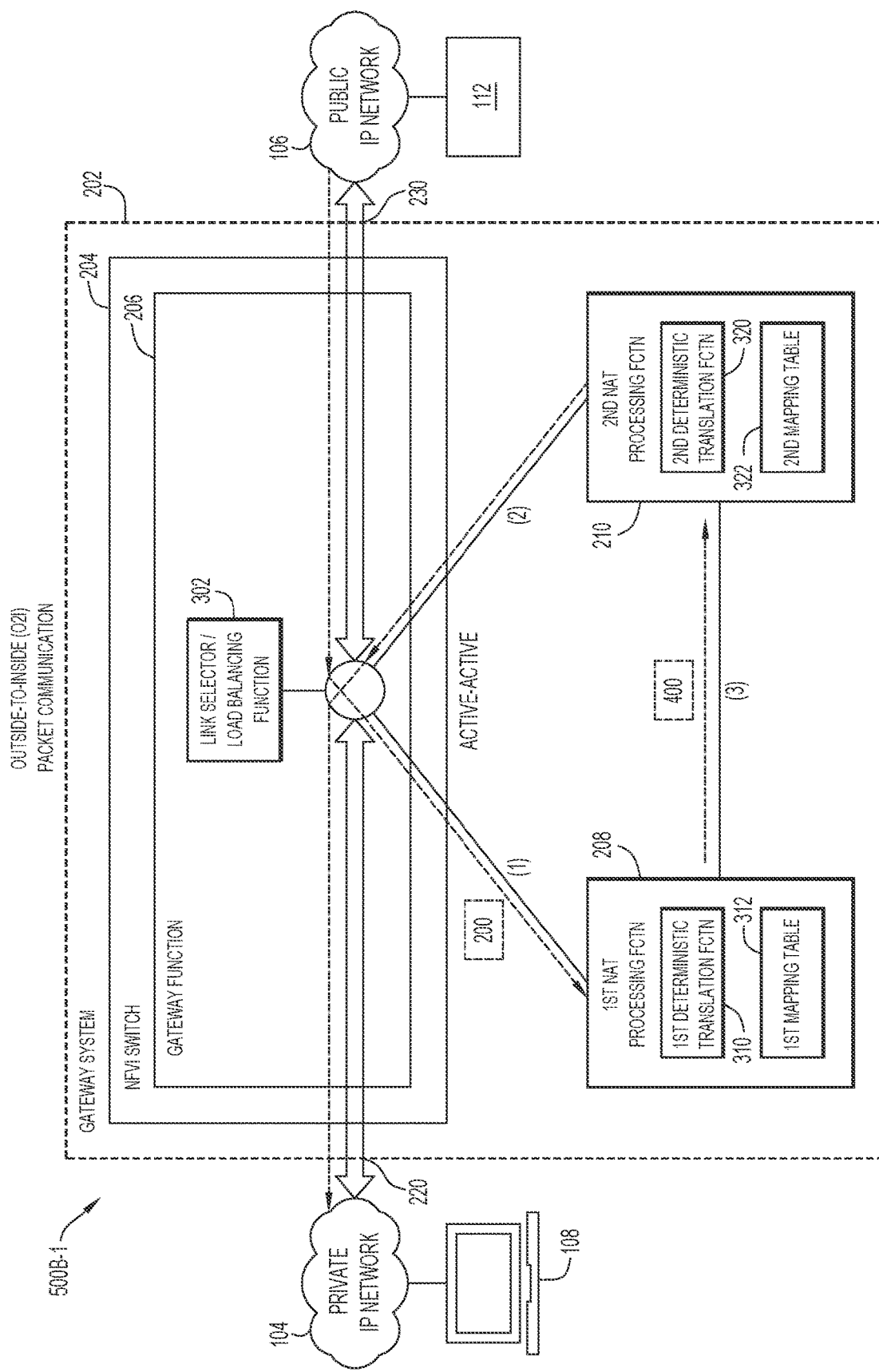
Figures 2, 5B:
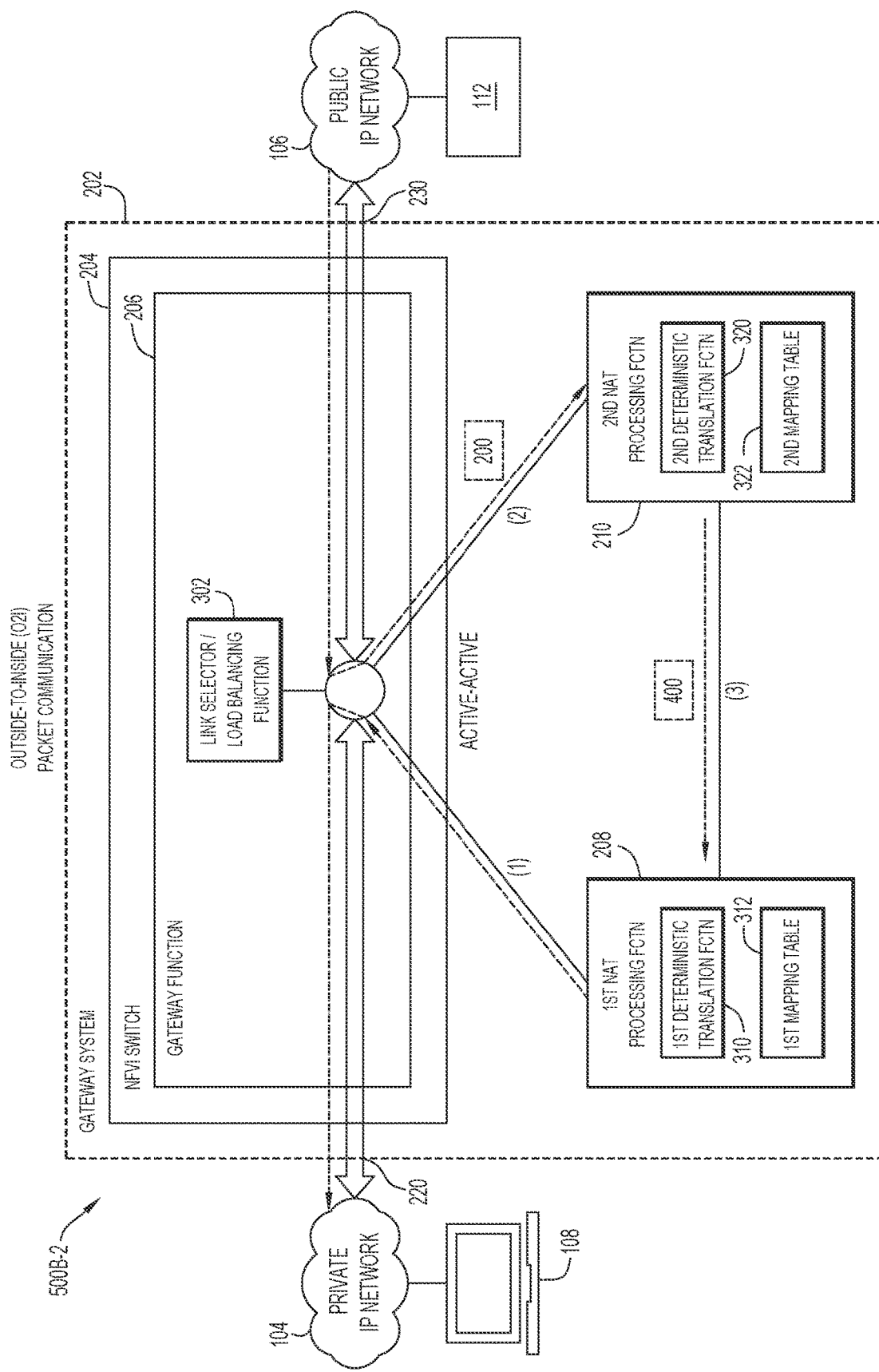
Figures 3, 5B:
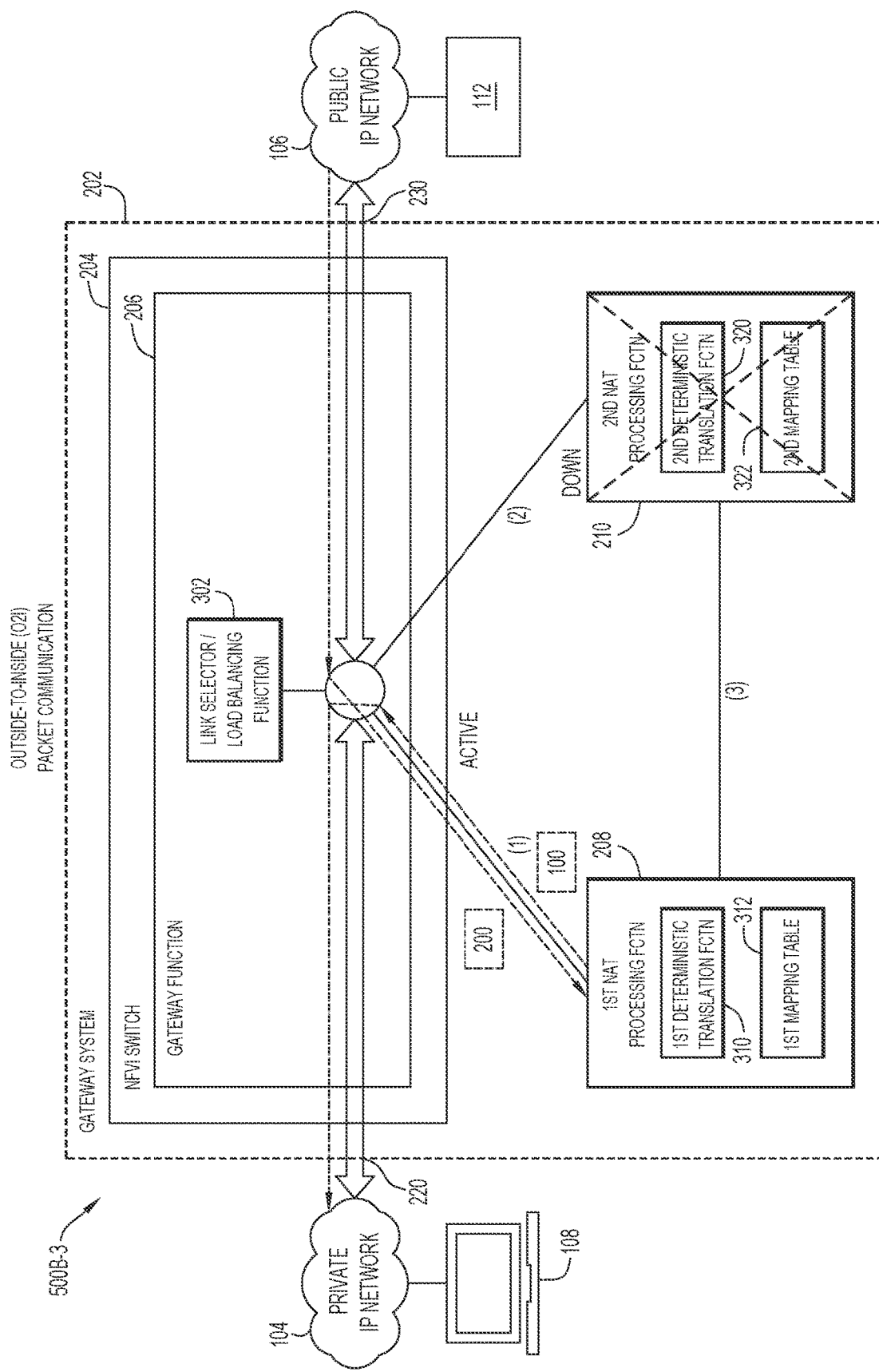
Figures 4, 5B:
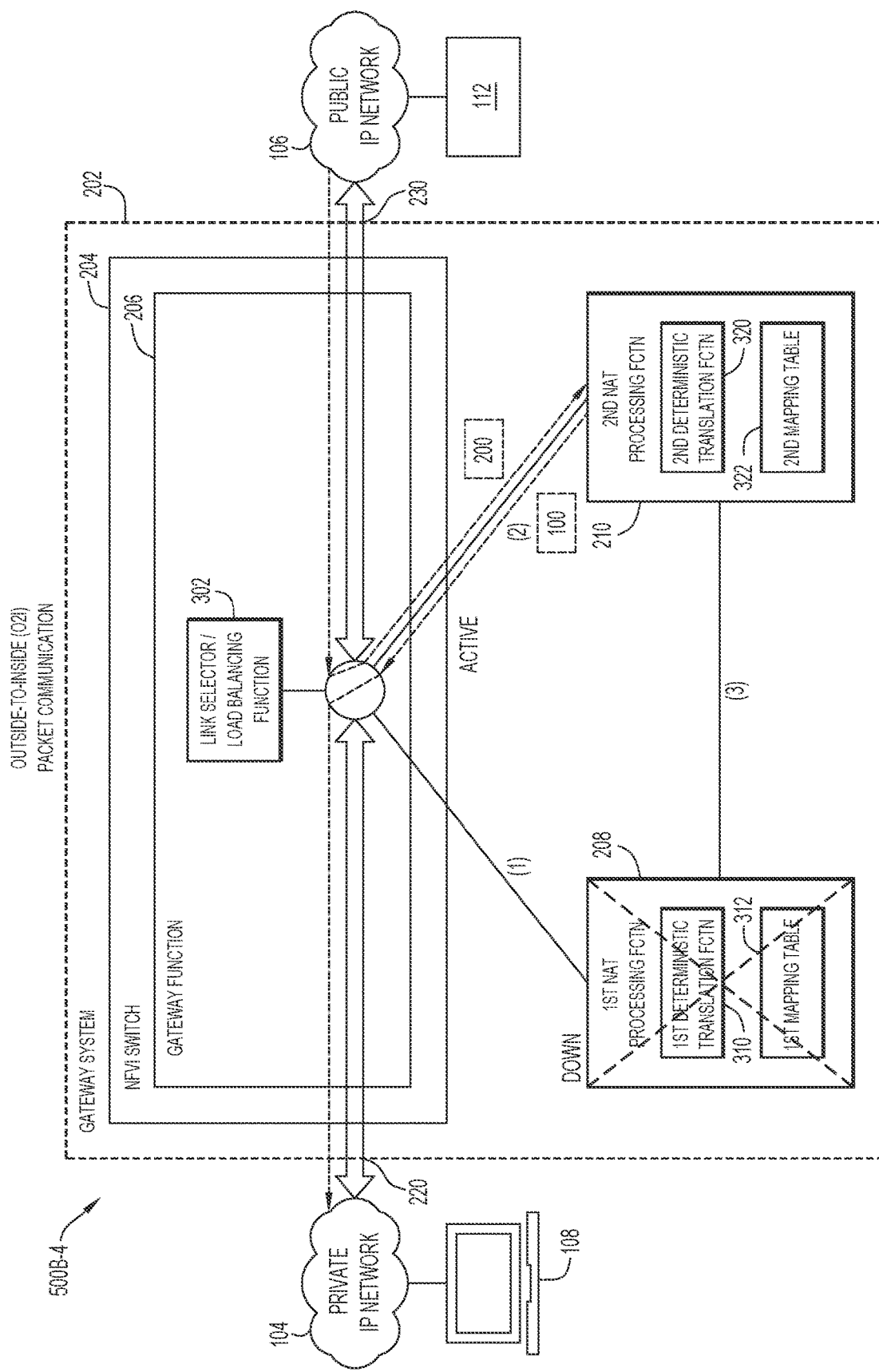

With reference to schematic block diagram 500B-1 of FIG. 5B-1, a packet is received at the gateway function 206 via egress port 230 of switch 204 (i.e., an O2I packet communication), where link selector function 302 selects link (1) for packet forwarding. The received packet is tagged with a VLAN ID of "200" and forwarded to first NAT processing function 208 via link (1). The received packet having the VLAN ID of "200" is processed at first NAT processing function 208. The received packet is then retagged with a VLAN ID of "400" and forwarded to second NAT processing function 210 via connecting link (3). The received packet having the VLAN ID of "400" is processed at second NAT processing function 210, which thereby produces an address/port translated packet. The address/port translated packet having the VLAN ID of "400" is then forwarded back to the gateway function 206 via link (2), for output via ingress port 220.

With reference to schematic block diagram 500B-2 of FIG. 5B-2, a packet is received at the gateway function 206 via egress port 230 of switch 204 (i.e., an O2I packet communication), where link selector function 302 selects link (2) for packet forwarding. The received packet is tagged with a VLAN ID of "200" and forwarded to second NAT processing function 210 via link (2). The received packet having the VLAN ID of "200" is processed at second NAT processing function 210. The received packet is then retagged with a VLAN ID of "400" and forwarded to first NAT processing function 208 via connecting link (3). The received packet having the VLAN ID of "400" is processed at first NAT processing function 208, which thereby produces an address/port translated packet. The address/port translated packet having the VLAN ID of "400" is then forwarded back to the gateway function 206 via link (1), for output via ingress port 220.

With reference to schematic block diagram 500B-3 of FIG. 5B-3, a packet is received at the gateway function 206 via egress port 230 of switch 204 (i.e., an O2I packet communication), for the case where second NAT processing function 210 is down, taken off-line, or otherwise inoperable. Thus, link selector function 302 selects link (1) for packet forwarding. The received packet is tagged with a VLAN ID of "200" and forwarded to first NAT processing function 208 via link (1). The received packet having the VLAN ID of "200" is processed at first NAT processing function 208. The address/port translated packet is retagged with a VLAN ID of "100" and forwarded back to the gateway function 206 via link (1), for output via ingress port 220.

With reference to schematic block diagram 500B-4 of FIG. 5B-4, a packet is received at the gateway function 206 via egress port 230 of switch 204 (i.e., an O2I packet communication), for the case where first NAT processing function 208 is down, taken off-line, or otherwise inoperable. Thus, link selector function 302 selects link (2) for packet forwarding. The received packet is tagged with a VLAN ID of "200" and forwarded to second NAT processing function 210 via link (2). The received packet having the VLAN ID of "200" is processed at second NAT processing function 210. The address/port translated packet is retagged with a VLAN ID of "100" and forwarded back to the gateway function 206 via link (2), for output via ingress port 220.

Figure 6:
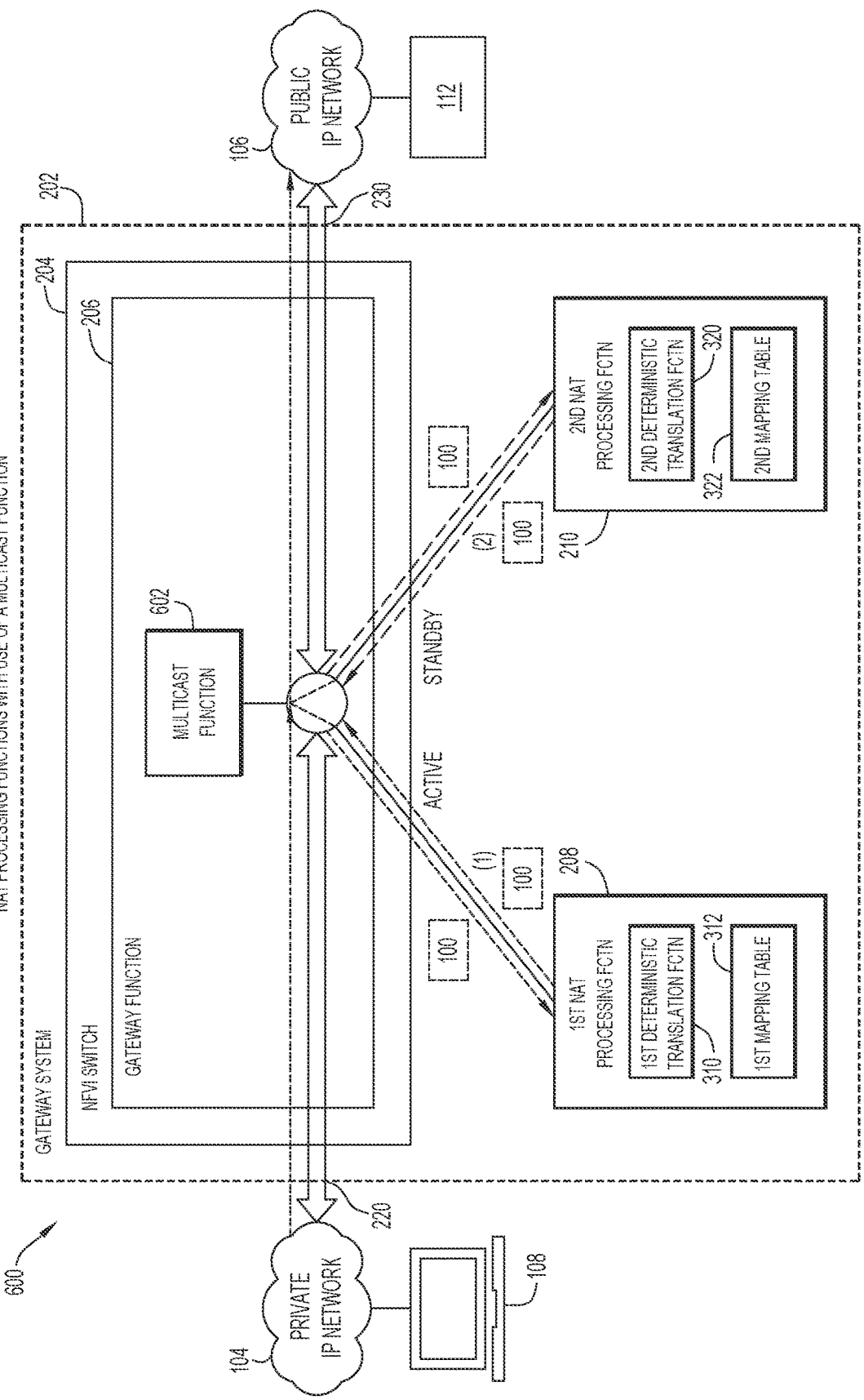
FIG. 6 is a schematic block diagram of the carrier-grade NAT gateway system of FIG. 2, which is further configured such that packet processing may be performed in a parallel manner at the first and the second NAT processing functions with use of a multicast function (e.g., an example of a second inventive variation)

FIG. 6 is a schematic block diagram 600 of gateway system 202 of FIG. 2 according to some implementations of the present disclosure, which is an example of the second inventive variation. More particularly, gateway system 202 of FIG. 6 is configured such that packet processing is performed in a parallel manner at first and second NAT processing functions 208 and 210 with use of a multicast function 602. As in the first inventive variation, first NAT processing function 208 is shown to include first deterministic address/port translation function 310 and first mapping table 312 for storing a plurality of first binding entries. Second NAT processing function 210 is shown to include second deterministic address/port translation function 320 and second mapping table 322 for storing a plurality of second binding entries. Again, in some implementations, second deterministic address/port translation function 320 of second NAT processing function 210 is the same as first deterministic address/port translation function 310 of first NAT processing function 208.

In some implementations, first and second deterministic address/port translation functions 310 and 320 are configured based on RFC 7422. In some additional implementations, first and second deterministic address/port translation functions 310 and 320 are further configured based on static port forwarding or pre-allocation according to PCP of RFC 6887. Again, first and second deterministic address/port translation functions 310 and 320 may be identical and/or use the same deterministic algorithm to allocate NAT bindings per RFC 7422 and/or RFC 6887.

As is apparent, redundancy and high availability may be provided in gateway system 202 of FIG. 6 with use of identical NAT functions having the same deterministic algorithm for allocating NAT bindings according to the present disclosure.

Again, gateway system 202 is configured such that packet processing is performed in a parallel manner at first and second NAT processing functions 208 and 210 with use of multicast function 602. Multicast function 602 is configured to communicate each received packet for processing at first and second NAT processing functions 208 and 210, by multicasting each received packet via the links (1) and (2) for processing, in a parallel manner, at the first and the second NAT processing functions 208 and 210.

Accordingly, switch 204 having multicast function 602 may multicast each received packet to both first and second NAT processing functions 208 and 210 (e.g., CNF instances) via links (1) and (2), which provides an "active/standby" redundancy as seen by the switch. In some implementations, conventional multicast routing protocols may be employed for establishing multicast communications and multicasting between multicast function 602 and the first and the second NAT processing functions 208 and 210.

If link (1) or first NAT processing function 208 is set in the active role, multicast function 602 operates to communicate a received packet over link (1) for processing at first NAT processing function 208, and the processed packet (e.g., an address/port translated packet) is returned over link (1) back to gateway function 206. Multicast function 602 also operates to communicate a replicated copy of the received packet over link (2) for processing at second NAT processing function 210 which is set in the standby role, and the processed packet (e.g., an additional address/port translated packet) is returned over link (2) back to gateway function 206. A selected one of the address/port translated packets may be selected for output via one of ingress and egress ports 220 and 230; the other address/port translated packet may be dropped. Assuming the received packet was initially received via ingress port 22 (i.e., an I2O packet communication), then gateway function 206 will output the processed packet from egress port 230.

On the other hand, if link (2) or second NAT processing function 210 is set in the active role, multicast function 602 operates to communicate a received packet over link (2) for processing at second NAT processing function 210, and the processed packet (e.g., an address/port translated packet) is returned over link (2) back to gateway function 206. Multicast function 602 also operates to communicate a replicated copy of the received packet over link (1) for processing at first NAT processing function 208 which is set in the standby role, and the processed packet (e.g., an additional address/port translated packet) is returned over link (1) back to gateway function 206. A selected one of the address/port translated packets may be selected for output via one of ingress and egress ports 220 and 230; the other address/port translated packet may be dropped. Assuming the received packet was initially received via ingress port 22 (i.e., an 120 packet communication), then gateway function 206 will output the processed packet from egress port 230.

In some implementations, the multicast function 602 and its associated processing may operate based on a "multicast-only fast reroute" (MoFRR) mechanism. The multicast-only fast reroute mechanism may be based on RFC 7431. See Multicast-Only Fast Reroute, Request for Comments (RFC) 7431, A. Karan, et al., August 2015, which is hereby incorporated by reference as though fully set forth herein. The RFC document describes a mechanism for minimizing packet loss in a network when node or link failures occur. The basic idea of MoFRR is for a merge point router (i.e., a router that joins a multicast stream via two divergent upstream paths) to join a multicast tree via two divergent upstream paths in order to get maximum redundancy. In general, MoFRR may be configured based on simple enhancements to basic multicast routing protocols such as Protocol Independent Multicast (PIM) and Multipoint LDP (mLDP).

In some implementations, a "hitless redundancy" approach is utilized with the multicast-only fast reroute mechanism. Conventional hitless redundancy involves the creation of duplicate flows of the sender (e.g., over two independent networks) so that the receiver can compare the flows and select the best available flow at any given time. The solution typically operates in real-time and on a flow-by-flow basis. Here, the receiver is typically provided with adequate buffering capabilities to lock the two feeds together, compare the equivalent sets of packets, and provide seamless switching between the flows.

Figure 7:
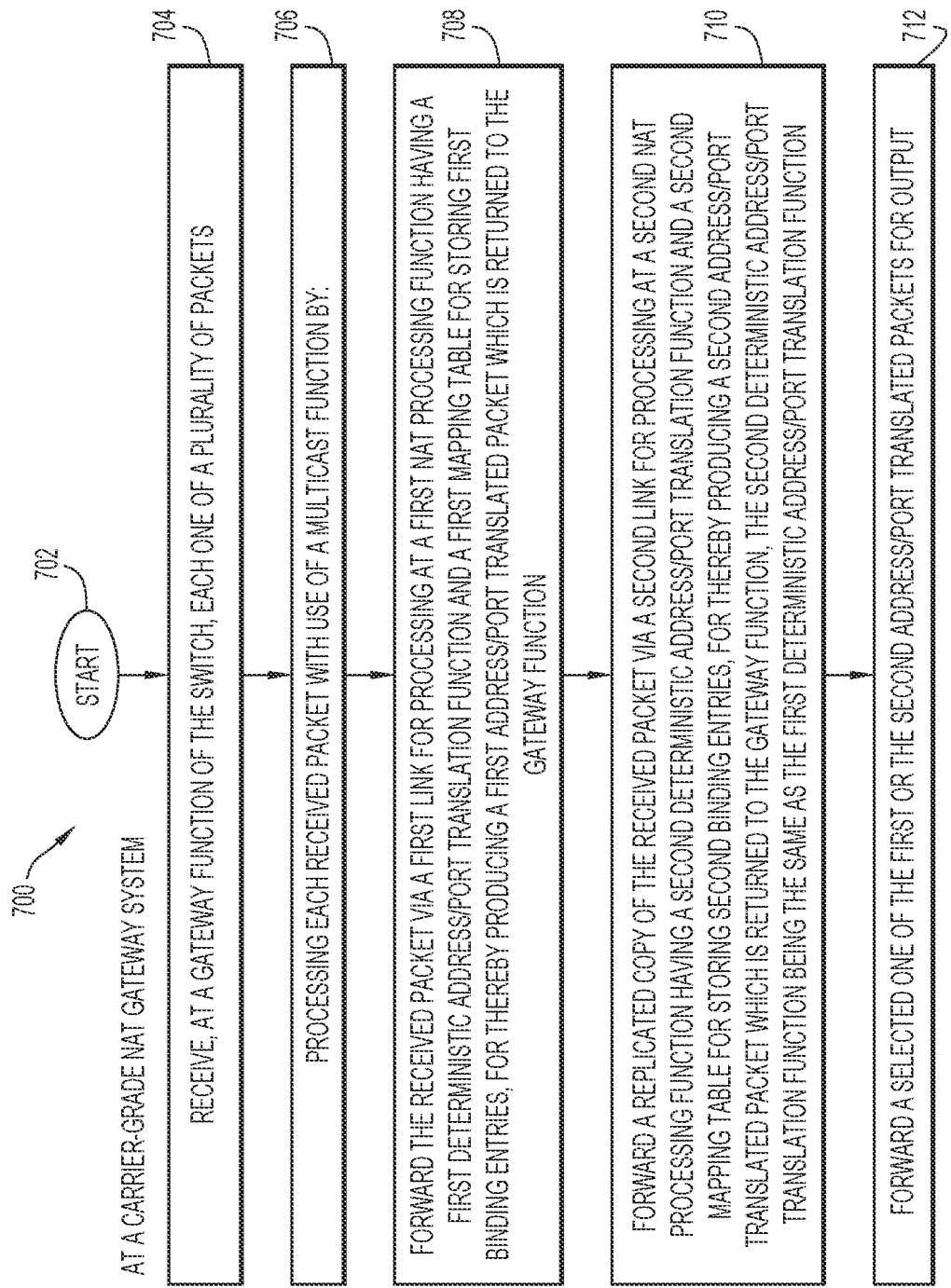
FIG. 7 is a flowchart for describing a method of processing packets at the carrier-grade NAT gateway system of FIG. 6 according to some implementations of the present disclosure (e.g., the second inventive variation)

FIG. 7 is a flowchart 700 for describing a method of processing packets at a gateway system of FIG. 6 according to some implementations of the present disclosure (e.g., the second inventive variation). In some implementations, the method of FIG. 7 may be performed by a gateway system comprised of a switch having a gateway function, an ingress port for connection to a private IP network, and an egress port for connection to a public IP network, for packet processing in a parallel manner at first and second NAT processing functions with use of a multicast function (e.g., gateway system 202 of FIG. 6). The method may be embodied in a computer program product which includes a non-transitory computer readable medium and instructions stored in the non-transitory computer readable medium, where the instructions are executable by one or more processors of the gateway system.

Beginning at a start block 702 of FIG. 7, each one of a plurality of packets that are communicated may be received at the gateway function (e.g., via the ingress port of the gateway system) (step 704 of FIG. 7). Each received packet may be processed by with use of a multicast function (step 706 of FIG. 7). With the multicast function, the received packet is forwarded via a first link for processing at a first NAT processing function having a first deterministic address/port translation function and a first mapping table for storing first binding entries, for thereby producing a first address/port translated packet which is returned to the gateway function (step 708 of FIG. 7). In addition, a replicated copy of the received packet is forwarded via a second link for processing at a second NAT processing function having a second deterministic address/port translation function and a second mapping table for storing second binding entries, for thereby producing a second address/port translated packet which is returned to the gateway function (step 710 of FIG. 7). In some implementations, the second deterministic address/port translation function is the same as the first deterministic address/port translation function. A selected one of the first or the second address/port translated packets may be selected for output (e.g., via the egress port) (step 712 of FIG. 7); the other redundant packet may be dropped.

More detail with respect to the packet processing in the first and the second NAT processing functions is now provided. In some implementations of FIG. 7, the first NAT processing function (e.g., in the active role) may receive the packet and perform a binding lookup for the received packet in the first mapping table. If no binding entry is found in the first mapping table for the received packet, the first NAT processing function may generate a first binding for the received packet using the first deterministic address/port translation function and store the first binding in the first mapping table. The first NAT processing function may process the received packet for producing a first address/port translated packet according to the first binding. The first address/port translated packet may be returned to the gateway function. In addition, the second NAT processing function (e.g., in the standby role) may receive the replicated copy of the received packet and perform the binding lookup for the replicated copy of the received packet in the second mapping table. If no binding entry is found in the second mapping table for the replicated copy of the received packet, the second NAT processing function may generate a second binding for the replicated copy of the received packet using the first deterministic address/port translation function and store the first binding in the first mapping table. The second NAT processing function may process the replicated copy of the received packet for producing a second address/port translated packet according to the second binding. The second address/port translated packet may be returned to the gateway function.

In some implementations of FIG. 7, when the first NAT processing function is inoperable, each subsequently received packet may be communicated via the second link for processing at the second NAT processing function (which, in some implementations, may be switched from the standby role to the active role). On the other hand, when the second NAT processing function is inoperable, each subsequently received packet may be communicated via the first link for processing at the first NAT processing function (which, in some implementations, may need to be switched from the standby role to the active role). As is apparent, redundancy and high availability in a carrier-grade NAT gateway system is provided.

As described previously, the switch of the gateway system may be a NFVI switch and the first and the second NAT processing functions may be implemented as separate NAT instances or separate CNF instances (e.g., provided in a single distributed network element or in separate network elements). In the second inventive variation, the multicast function is utilized for multicast communication with the CNF instances. More specifically, the multicast function may implement a multicast-only fast reroute approach. Here, the NFVI switch may multicast each received packet to both of the CNF instances, providing an "active/standby" redundancy as seen by the NFVI switch.

In a more generalized approach to what is shown and described in relation to the figures (e.g., FIGS. 6 and 7), the gateway system may be an N-way active, redundant system having multiple links to multiple NAT processing functions, where N≥2 (e.g., N=2, 3, 4, etc.).

Packet processing at the different CNF instances in the parallel manner (e.g., FIGS. 6 and 7) may be better facilitated with use of VLAN ID tagging, where VLAN IDs are "pushed" (added) onto and "popped" (removed) from each packet communication. To better explain, an illustrative example associated with the second inventive variation is now described, where the gateway system utilizes first and second (identical) CNF instances. From the NFVI switch, link (1) to the first CNF instance is provided and link (2) is to the second CNF instance is provided; in some implementations, no connecting link (3) between the first and the second CNF instances is needed.

The NFVI switch may maintain an active/standby interface per public pool, which ensures there is only one master for NAT allocations at any given time. Multiple pools need not all be active on the same CNF instance, which allows reasonable load balancing across both CNF instances.

Consider one pool "active" on the first CNF instance and "standby" on the second CNF instance. The NFVI switch may push VLAN ID "100" on all I2O flows and VLAN ID "200" on all O2I flows. Note that the VLAN "pop" and "push" operations may be symmetric with the same incoming and outgoing VLAN IDs. The NFVI switch may multicast them to both the first and the second CNF instances.

For I2O flows, both the first and the second CNF instances may independently allocate NAT bindings. These are automatically in sync because the bindings are deterministic, and the allocation algorithm is same on both CNF instances. For O2I flows, both the first and the second CNF instances independently service the packets, provided an I2O NAT binding exists already. If no binding exists, they drop the packet. Post-NAT processing, the first and the second CNF instances may send back the packets over the same link they were received. The NFVI switch may drop incoming packets received from the "standby" CNF instance for both the I2O and O2I flows.

When the "active" CNF instance goes down, the NFVI switch may switch the active/standby state of the interfaces to the remaining link that is up. In some implementations, statistics may be made available from both of the devices; logs can either be correlated or made available from both of the devices.

To further illustrate the above example, FIGS. 8A-1, 8A-2, and 8A-3 are schematic block diagrams 800A-1, 800A-2, and 800A-3 which illustrate example packet processing at gateway system 202 of FIG. 6 with use of VLAN ID tagging to implement the method of FIG. 7, for I2O packet communication according to some implementations. In this example, link (1) is generally designated as the active interface and link (2) is generally designated as the standby interface.

Figures 1, 8A:
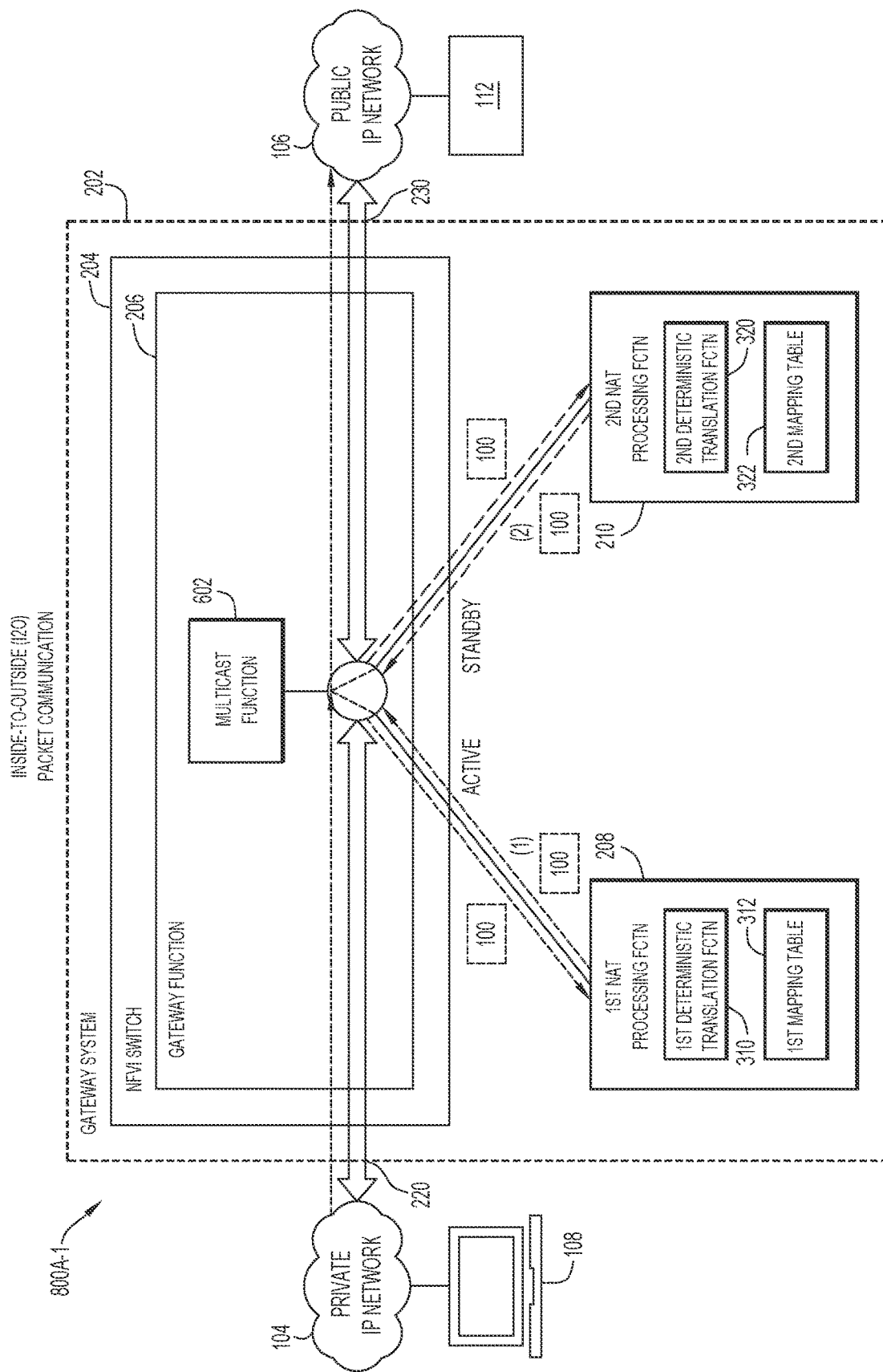
Figures 2, 8A:
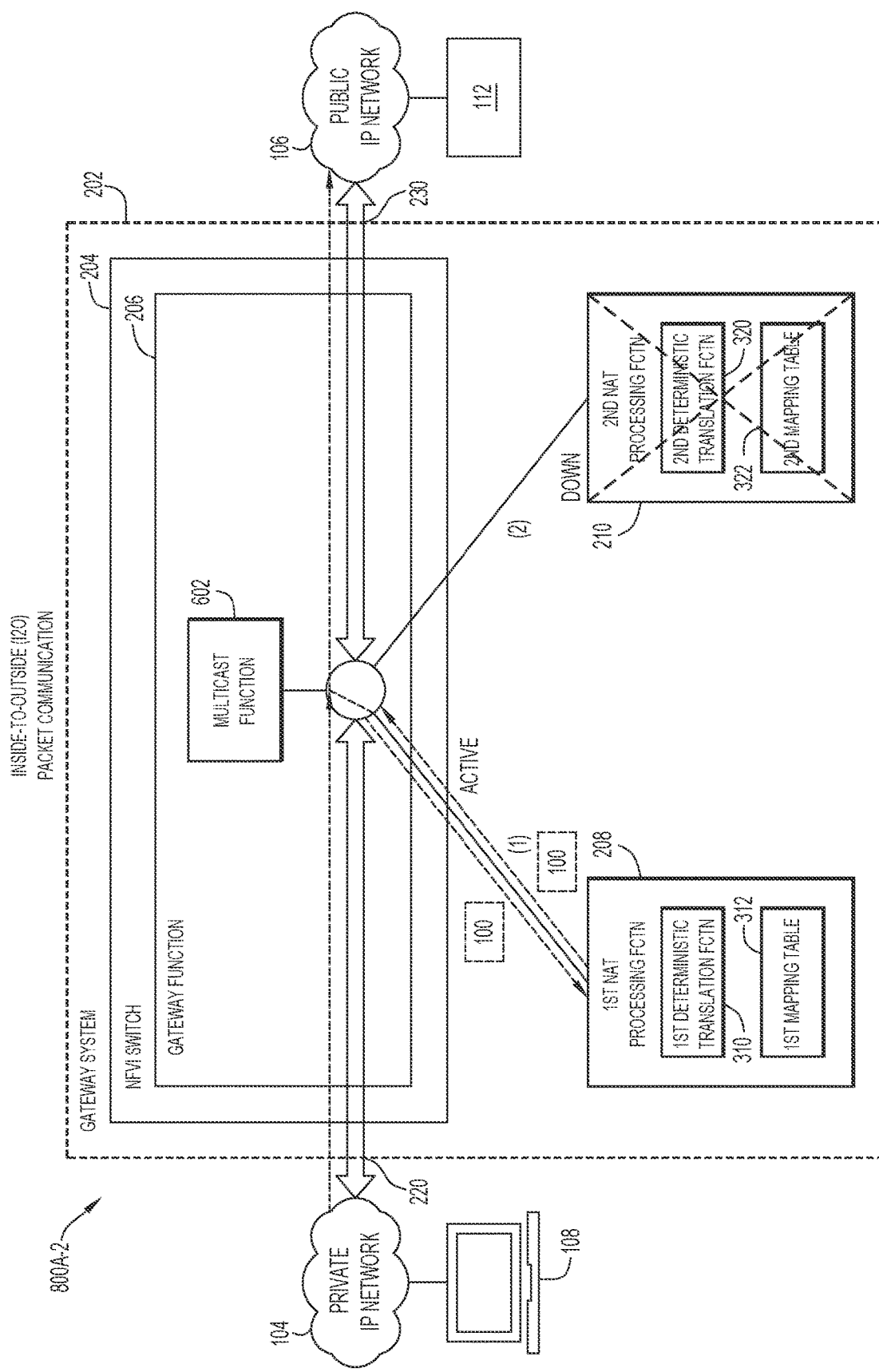
Figures 3, 8A:
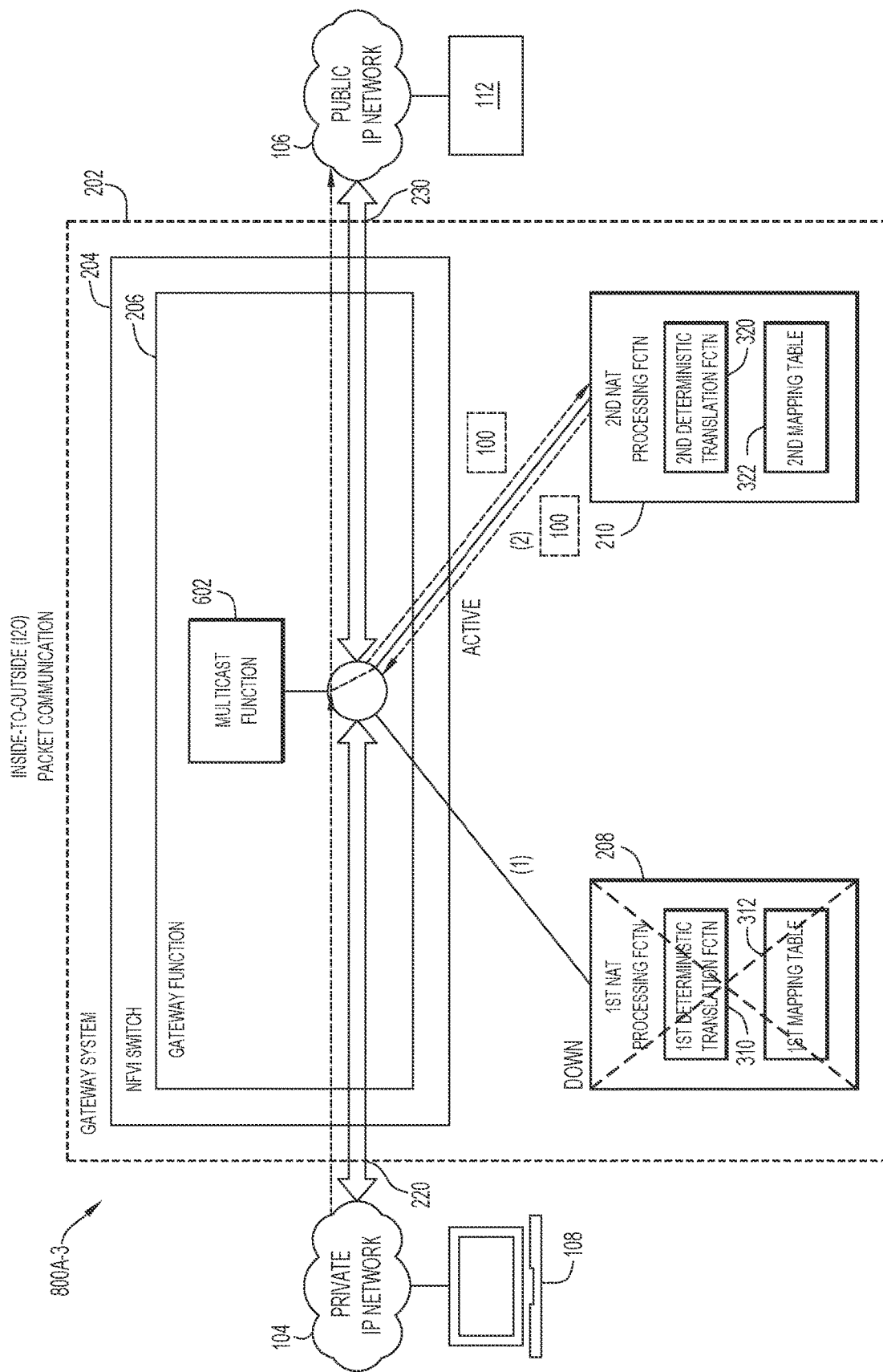

With reference to schematic block diagram 800A-1 of FIG. 8A-1, a packet is received at the gateway function 206 via ingress port 220 of switch 204 (i.e., an I2O packet communication). Switch 204 operates to tag the received packet with a VLAN ID of "100." Multicast function 602 operates to forward the received packet having the VLAN ID of "100" via link (1) to first NAT processing function 208 for processing. The address/port translated packet having the VLAN ID of "100" is then forwarded and returned back to the gateway function 206 via link (1). Multicast function 602 also operates to forward a replicated copy of the received packet having the VLAN ID of "100" via link (2) to second NAT processing function 210 for processing. The additional address/port translated packet having the VLAN ID of "100" is then forwarded and returned back to the gateway function 206 via link (2) for output via egress port 230. One of the address/port translated packets is selected (e.g., the active interface) for output via egress port 230, and the redundant packet is discarded.

With reference to schematic block diagram 800A-2 of FIG. 8A-2, a packet is received at the gateway function 206 via ingress port 220 of switch 204 (i.e., an I2O packet communication), for the case where second NAT processing function 210 is down, taken off-line, or otherwise inoperable. Switch 204 operates to tag the received packet with a VLAN ID of "100." Multicast function 602 operates to forward the received packet having the VLAN ID of "100" via link (1) to first NAT processing function 208 for processing. The address/port translated packet having the VLAN ID of "100" is then forwarded and returned back to the gateway function 206 via link (1). As second NAT processing function 210 is inoperable, multicast function 602 does not forward any replicated copy of the received packet via link (2). The address/port translated packets that is received via link (1) is selected (e.g., the active interface) for output via egress port 230.

With reference to schematic block diagram 800A-3 of FIG. 8A-3, a packet is received at the gateway function 206 via ingress port 220 of switch 204 (i.e., an I2O packet communication), for the case where first NAT processing function 208 is down, taken off-line, or otherwise inoperable. Prior to receiving the packet, switch 204 had operated to switch the link (2) and/or its associated second NAT processing function 210 from standby to active (e.g., upon identifying the inoperability of first NAT processing function 208). Switch 204 operates to tag the received packet with a VLAN ID of "100." Multicast function 602 operates to forward the received packet having the VLAN ID of "100" via link (2) to second NAT processing function 210 for processing. The address/port translated packet having the VLAN ID of "100" is then forwarded and returned back to the gateway function 206 via link (2). As first NAT processing function 208 is inoperable, multicast function 602 does not forward any replicated copy of the received packet via link (1). The address/port translated packets that is received via link (2) is selected (e.g., the active interface) for output via egress port 230.

[moo] FIGS. 8B-1, 8B-2, and 8B-3 are schematic block diagrams 800B-1, 800B-2, and 800B-3 which illustrate example packet processing at gateway system 202 of FIG. 6 with use of VLAN ID tagging to implement the method of FIG. 7, for O2I packet communication according to some implementations. As will be apparent, the example packet processing in relation to FIGS. 8B-1, 8B-2, and 8B-3 is different from the example packet processing in relation to previous FIGS. 8A-1, 8A-2, and 8A-3, and also makes use of a different VLAN ID tag for proper routing (e.g., VLAN ID of "200" instead of "100").

More specifically, it is shown in FIGS. 8B-1, 8B-2, and 8B-3 that switch 204 having gateway function 206 may use multicast function 602 which includes or operates together with a link selector function (e.g., a load balancing function indicated as "W/LOAD BAL") for O2I packet communications. Here, O2I flows may be load balanced—not multicasted—across first and second NAT processing functions 208 and 210 without use of any active/standby states by switch 204, as first and second NAT processing functions 208 and 210 have the same bindings created already by their associated I2O flows. When link (1) is selected, the received packet is communicated over link (1) for processing at first NAT processing function 208, the processed packet is communicated over link (1) back to gateway function 206 and then output from ingress port 220. When link (2) is selected, the received packet is communicated over link (2) for processing at second NAT processing function 210, the processed packet is communicated over link (2) back to gateway function 206 and then output from ingress port 220.

Figures 1, 8B:
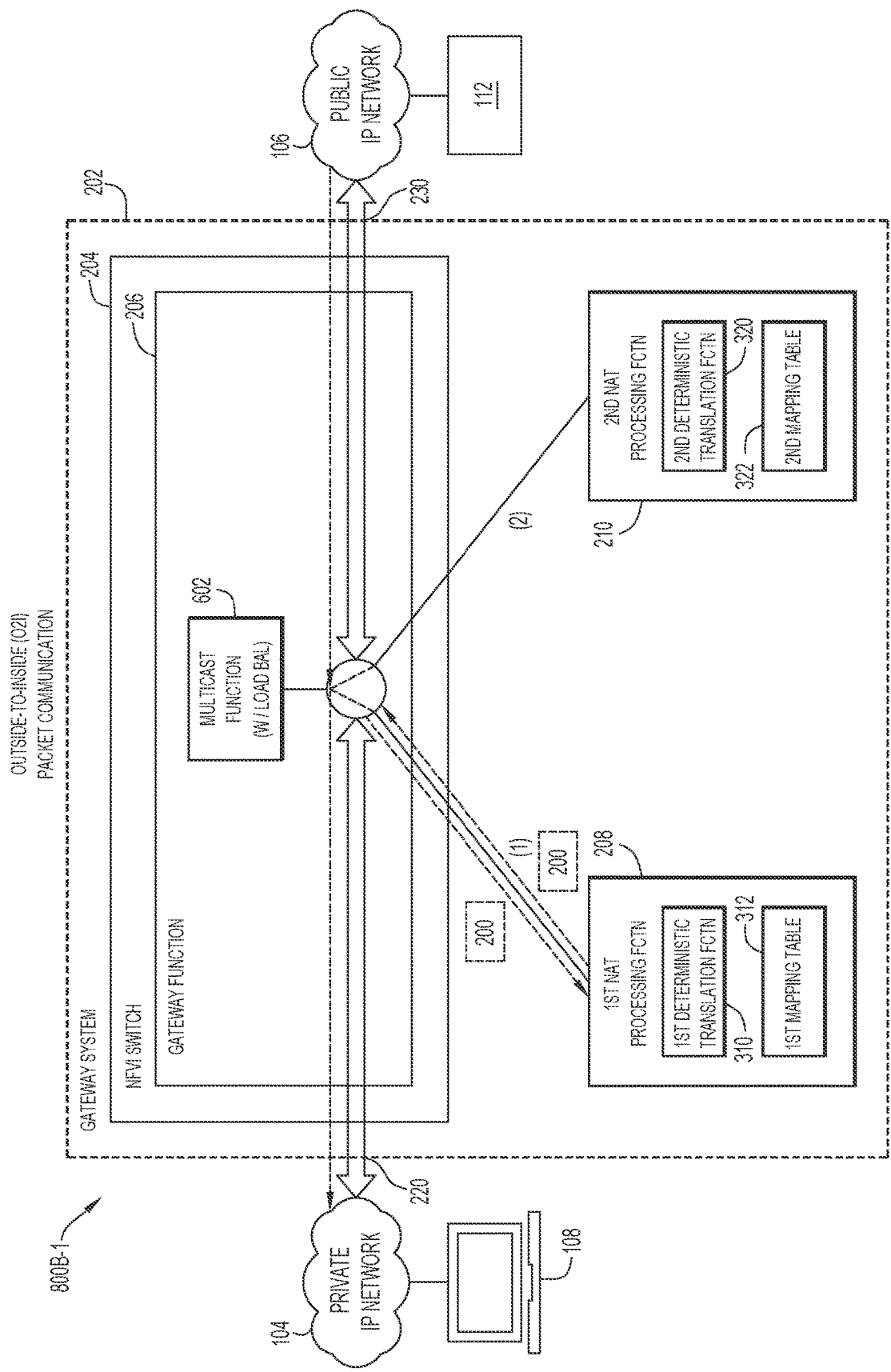
Figures 2, 8B:
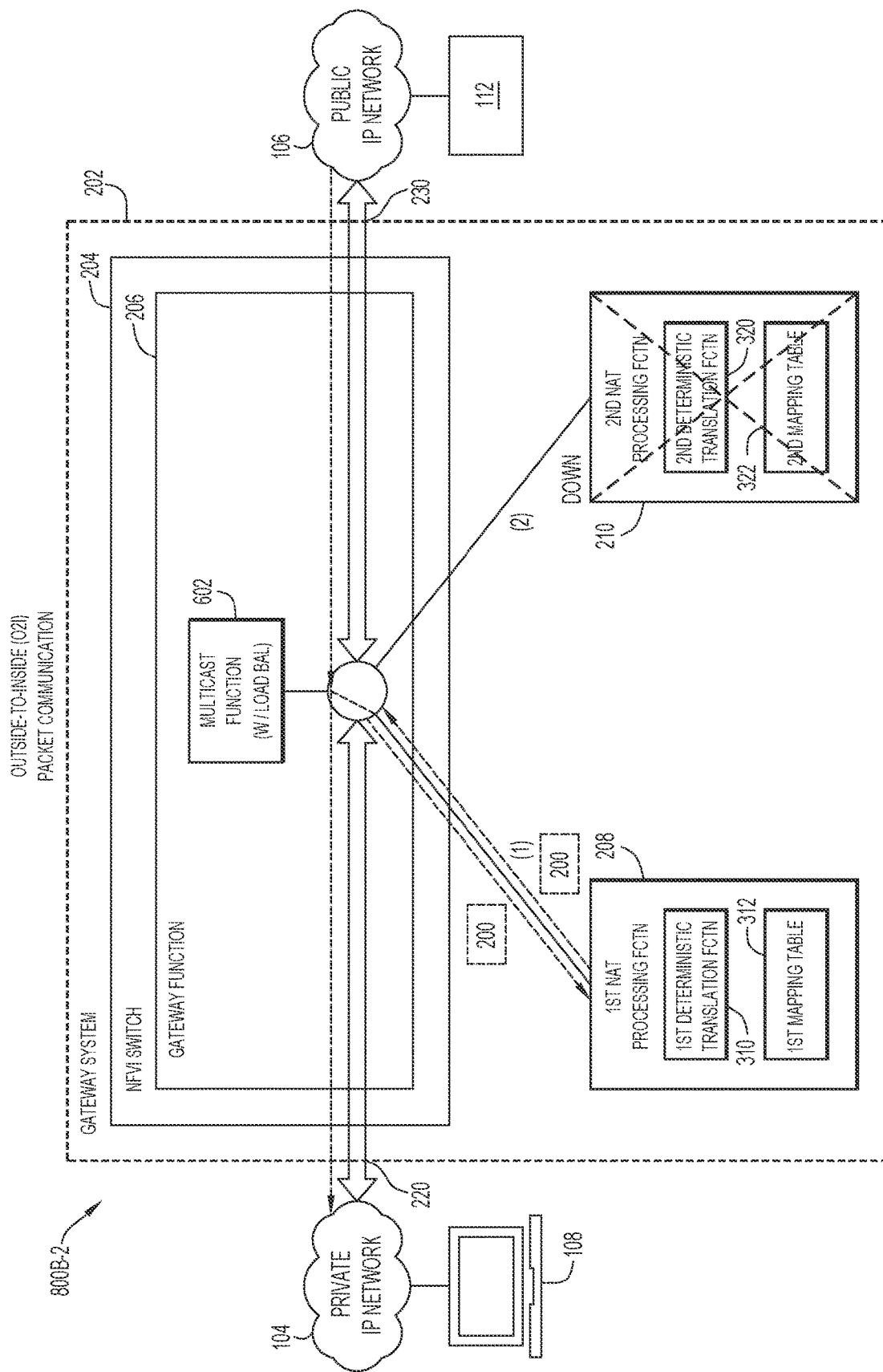
Figures 3, 8B:
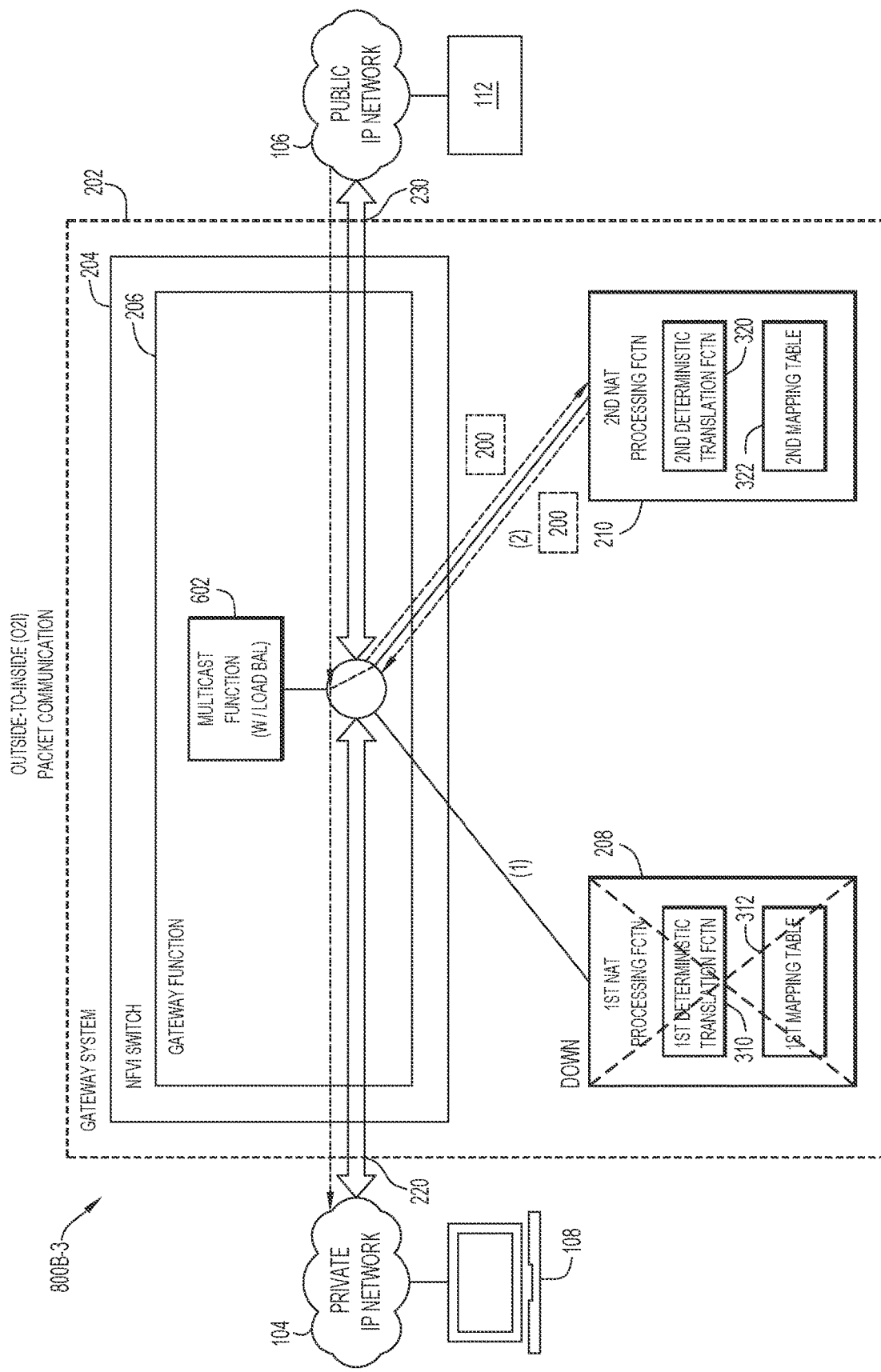

With reference to schematic block diagram 800B-1 of FIG. 8B-1, a packet is received at the gateway function 206 via egress port 230 of switch 204 (i.e., an O2I packet communication). Switch 204 operates to tag the received packet with a VLAN ID of "200." In this example, the load balancing function operates to select link (1) for processing. Here, the load balancing function may forward the received packet having the VLAN ID of "200" via link (1) to first NAT processing function 208 for processing. The address/port translated packet having the VLAN ID of "200" is then forwarded and returned back to the gateway function 206 via link (1). The address/port translated packet is then communicated for output via ingress port 220.

With reference to schematic block diagram 800B-2 of FIG. 8B-2, a packet is received at the gateway function 206 via egress port 230 of switch 204 (i.e., an O2I packet communication), for the case where second NAT processing function 210 is down, taken off-line, or otherwise inoperable. Switch 204 operates to tag the received packet with a VLAN ID of "200." The load balancing function operates to forward the received packet having the VLAN ID of "200" via link (1) to first NAT processing function 208 for processing. The address/port translated packet having the VLAN ID of "200" is then forwarded and returned back to the gateway function 206 via link (1). The address/port translated packet that is received via link (1) is output via egress port 230.

With reference to schematic block diagram 800B-3 of FIG. 8B-3, a packet is received at the gateway function 206 via egress port 230 of switch 204 (i.e., an O2I packet communication), for the case where first NAT processing function 208 is down, taken off-line, or otherwise inoperable. Switch 204 operates to tag the received packet with a VLAN ID of "200." The load balancing function operates to forward the received packet having the VLAN ID of "200" via link (2) to second NAT processing function 210 for processing. The address/port translated packet having the VLAN ID of "200" is then forwarded and returned back to the gateway function 206 via link (2). The address/port translated packet that is received via link (2) is output via egress port 230.

Again, more generally, switch 204 having gateway function 206 is configured to communicate each received packet for processing at both first and second NAT processing functions 208 and 210, in either a serial manner or a parallel manner. In some implementations, the selection of the manner of processing (e.g., serial vs. parallel) may depend on one or more factors or considerations for the solution and/or the gateway switch. For example, the selection of the manner of processing may be based on one or more factors or considerations that relate to latency and/or throughput. In one illustrative example, if a low latency solution is desired and the gateway switch is operable to multicast at "wire" speed, then the parallel manner (e.g., FIGS. 6, 7, 8A-1 through 8A-3, and/or 8B-1 through 8B-3) may be utilized, as the serial manner (e.g., service-chaining) would undesirably serially add to the packet latency. In another illustrative example, if throughput of the gateway switch is a primary consideration, then the serial manner (e.g., FIGS. 3, 4A through 4C, FIGS. 5A-1 through 5A-4, and/or 5B-1 through 5B-4) may be utilized, as the parallel manner (i.e., multicast) with its packet replication would undesirably increase switching throughput.

Thus, as described above, several inventive techniques/mechanisms are provided including a technique/mechanism for use in a stateful switchover of the traffic load across deterministic NAT function instances and static port configuration using a service chaining approach for state synchronization; as well as a technique/mechanism for use in a stateful switchover of the traffic load across deterministic NAT function instances and static port configuration with use of a multicast-only fast reroute approach.

FIG. 9 illustrates a hardware block diagram of a computing device 900 or a network node that may perform functions associated with operations discussed herein in connection with the techniques described in relation to the above figures. In various embodiments, a computing device, such as computing device 900 or any combination of computing devices 900, may be configured as any entity/entities as discussed for the techniques depicted in connection with the figures in order to perform operations of the various techniques discussed herein. In particular, computing device 900 may perform operations at a gateway system for operation in accordance with the processing/messaging of the first inventive variation or the second inventive variation, each one of which is described above in relation to the previous figures.

In at least one embodiment, computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), VLAN, wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, IoT network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combined multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A carrier-grade network address translation (NAT) gateway system, comprising:
    a switch;
    an ingress port for connection to a private Internet Protocol (IP) network;
    an egress port for connection to a public IP network;
    the switch including:
       a first link to a first NAT processing function having a first deterministic address/port translation function and a first mapping table for storing first binding entries;
       a second link to a second NAT processing function having a second deterministic address/port translation function and a second mapping table for storing second binding entries, the second deterministic address/port translation function being the same as the first deterministic address/port translation function; and
       a gateway function configured to receive each one of a plurality of received packets that are communicated via the ingress and the egress ports, and to communicate each received packet for processing at both the first and the second NAT processing functions.

2. The carrier-grade NAT gateway system of claim 1, wherein each received packet is associated with a flow, and the switch having the gateway function further comprises:
    a link selector function configured to select, on a flow-by-flow basis, a selected one of the first link or the second link for communicating each received packet for processing, in a serial manner, at the first and the second NAT processing functions that are established in a service chain via one or more connecting links.

3. The carrier-grade NAT gateway system of claim 1, wherein each received packet is associated with a flow, and the switch having the gateway function further comprises:
    a load balancing function configured to select, on a flow-by-flow basis, a selected one of the first link or the second link for communicating each received packet for processing, in a serial manner, at the first and the second NAT processing functions that are established in a service chain via one or more connecting links.

4. The carrier-grade NAT gateway system of claim 3, wherein the switch having the gateway function is further configured to:
    when the first NAT processing function is inoperable, communicate each subsequently received packet via the second link for processing at the second NAT processing function; and
    when the second NAT processing function is inoperable, communicate each subsequently received packet via the first link for processing at the first NAT processing function.

5. The carrier-grade NAT gateway system of claim 1, wherein the switch having the gateway function further comprises:
    a multicast function configured to communicate each received packet for processing at the first and the second NAT processing functions by multicasting each received packet via the first and the second links for processing, in a parallel manner, at the first and the second NAT processing functions.

6. The carrier-grade NAT gateway system of claim 5, wherein the switch having the gateway function is further configured to:
    when the first NAT processing function is inoperable, communicate each subsequently received packet via the second link for processing at the second NAT processing function; and
    when the second NAT processing function is inoperable, communicate each subsequently received packet via the first link for processing at the first NAT processing function.

7. The carrier-grade NAT gateway system of claim 1, wherein:
    the switch comprises a network function virtualization infrastructure (NFVI) switch, and
    the first and the second NAT processing functions comprise virtualized network functions (VNFs).

8. The carrier-grade NAT gateway system of claim 1, wherein:
    the first and the second NAT processing functions are provided in a single distributed network element of the carrier-grade NAT gateway system, or
    the first and the second NAT processing functions are provided in separate network elements of the carrier-grade NAT gateway system.

9. The carrier-grade NAT gateway system of claim 1, wherein the first and the second deterministic address/port translation functions are configured based on Request for Comments (RFC) 7422, and are further configured based on static port forwarding or pre-allocation according to port control protocol (PCP) of RFC 6887.

10. A method for use in a carrier-grade network address translation (NAT) gateway system comprising a switch having a gateway function, an ingress port for connection to a private Internet Protocol (IP) network, and an egress port for connection to a public IP network, the method comprising:

receiving, at the gateway function, each one of a plurality of received packets that are communicated via the ingress port;

processing each one of the received packets by:

selecting, with a link selector function, one of a first link to a first NAT processing function or a second link to a second NAT processing function;

when the first link is selected for a received packet, forwarding the received packet via the first link for processing at the first NAT processing function which has a first deterministic address/port translation function and a first mapping table for storing first binding entries;

forwarding the received packet via one or more connecting links for processing at the second NAT processing function which has a second deterministic address/port translation function and a second mapping table for storing second binding entries, which thereby produces an address/port translated packet, the second deterministic address/port translation function being the same as the first deterministic address/port translation function; and forwarding the address/port translated packet via the second link back to the gateway function for output via one of the ingress and the egress ports.

11. The method of claim 10, wherein the received packet comprises a first received packet and the address/port translated packet comprises a first address/port translated packet, and wherein processing each received packet further comprises:

when the second link is selected for a second received packet, forwarding the second received packet via the second link for processing at the second NAT processing function which has the second deterministic address/port translation function and the second mapping table for storing the second binding entries;

forwarding the second received packet via the one or more connecting links for processing at the first NAT processing function which has the first deterministic address/port translation function and the first mapping table for storing the first binding entries, which thereby produces a second address/port translated packet; and forwarding the second address/port translated packet via the first link back to the gateway function for output via one of the ingress and the egress ports.

12. The method of claim 10, further comprising:
at the first NAT processing function,
performing a binding lookup for the received packet in the first mapping table;
if no binding entry is found in the first mapping table for the packet, generating a first binding for the received packet using the first deterministic address/port translation function and storing the first binding in the first mapping table;
at the second NAT processing function,
performing the binding lookup for the received packet in the second mapping table;
if no binding entry is found in the second mapping table for the received packet, generating a second binding for the received packet using the second deterministic address/port translation function and storing the second binding in the second mapping table; and processing the received packet for producing the address/port translated packet according to the second binding.

13. The method of claim 11, further comprising:
at the first NAT processing function for the first received packet,
performing a binding lookup for the first received packet in the first mapping table;
if no binding entry is found in the first mapping table for the first received packet, generating a first binding for the first received packet using the first deterministic address/port translation function and storing the first binding in the first mapping table;
at the second NAT processing function for the first received packet,
performing the binding lookup for the first received packet in the second mapping table;
if no binding entry is found in the second mapping table for the first received packet, generating a second binding for the first address/port translated packet using the second deterministic address/port translation function and storing the second binding in the second mapping table;
processing the first received packet for producing the first address/port translated packet according to the second binding;
at the second NAT processing function for the second received packet,
performing the binding lookup for the second received packet in the second mapping table;
if no binding entry is found in the second mapping table for the second received packet, generating a third binding for the second received packet using the second deterministic address/port translation function and storing the third binding in the second mapping table;
at the first NAT processing function for the second received packet,
performing the binding lookup for the second received packet in the second mapping table;
if no binding entry is found in the second mapping table for the second received packet, generating a fourth binding for the second received packet using the second deterministic address/port translation function and storing the fourth binding in the second mapping table; and
processing the second received packet for producing the second address/port translated packet according to the fourth binding.

14. The method of claim 11, wherein the link selector function comprises a load balancing function for selecting one of the first link to the first NAT processing function or the second link to the second NAT processing function.

15. The method of claim 10, wherein the first and the second deterministic address/port translation functions are configured based on Request for Comments (RFC) 7422.

16. A method for use in a carrier-grade network address translation (NAT) gateway system comprising a switch having a gateway function, an ingress port for connection to a private Internet Protocol (IP) network, and an egress port for connection to a public IP network, the method comprising:

receiving, at the gateway function, each one of a plurality of received packets that are communicated via the ingress port;

processing each one of the received packets with use of a multicast function, which includes:
- forwarding a received packet via a first link for processing at a first NAT processing function having a first deterministic address/port translation function and a first mapping table for storing first binding entries, for thereby producing a first address/port translated packet which is returned to the gateway function;
- forwarding a replicated copy of the received packet via a second link for processing at a second NAT processing function having a second deterministic address/port translation function and a second mapping table for storing second binding entries, for thereby producing a second address/port translated packet which is returned to the gateway function, the second deterministic address/port translation function being the same as the first deterministic address/port translation function; and
- forwarding a selected one of the first or the second address/port translated packets for output via the egress port.

17. The method of claim 16, further comprising:

at the first NAT processing function for the received packet,
- performing a binding lookup for the received packet in the first mapping table;
- if no binding entry is found in the first mapping table for the received packet, generating a first binding for the received packet using the first deterministic address/port translation function and storing the first binding in the first mapping table;
- processing the received packet for producing a first address/port translated packet according to the first binding;

at the second NAT processing function for the replicated copy of the received packet,
- performing the binding lookup for the replicated copy of the received packet in the second mapping table;
- if no binding entry is found in the second mapping table for the replicated copy of the received packet, generating a second binding for the replicated copy of the received packet using the first deterministic address/port translation function and storing the first binding in the first mapping table; and
- processing the replicated copy of the received packet for producing a second address/port translated packet according to the second binding.

18. The method of claim 16, further comprising:

when the first NAT processing function is inoperable, forwarding each subsequently received packet for processing via the second NAT processing function; and when the second NAT processing function is inoperable, forwarding each subsequently received packet for processing via the first NAT processing function.

19. The method of claim 16, wherein the multicast function is configured based on a multicast-only fast reroute mechanism.

20. The method of claim 16, wherein the first and the second deterministic address/port translation functions are configured based on Request for Comments (RFC) 7422.

* * * * *